(12) United States Patent
Sumioka et al.

(10) Patent No.: US 8,749,859 B2
(45) Date of Patent: *Jun. 10, 2014

(54) READING APPARATUS AND PRINTING APPARATUS

(71) Applicant: Canon Kabushiki Kaisha, Tokyo (JP)

(72) Inventors: Masaki Sumioka, Yokohama (JP);
Junichi Kubokawa, Kawasaki (JP);
Toshiaki Yamaguchi, Machida (JP);
Yukimichi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,366

(22) Filed: Nov. 21, 2012

(65) Prior Publication Data

US 2013/0135698 A1    May 30, 2013

(30) Foreign Application Priority Data

Nov. 25, 2011  (JP) ................... 2011-257427
Jan. 20, 2012  (JP) ................... 2012-009970
Apr. 27, 2012  (JP) ................... 2012-104178

(51) Int. Cl.
*H04N 1/04*   (2006.01)
*H04N 1/00*   (2006.01)
*H04N 1/38*   (2006.01)
*G06K 9/20*   (2006.01)
*B41J 2/435*  (2006.01)

(52) U.S. Cl.
USPC ........... 358/498; 358/474; 358/496; 358/408; 358/463; 382/321; 347/264

(58) Field of Classification Search
USPC ............ 358/498, 474, 496; 382/321; 347/264
See application file for complete search history.

(56) References Cited

U.S. PATENT DOCUMENTS

| 5,416,613 | A  | 5/1995  | Rolleston et al. |
| 7,864,783 | B2 | 1/2011  | Brewer et al. |
| 8,320,030 | B2 | 11/2012 | Kimura |
| 8,508,818 | B2 | 8/2013  | Tohnai |
| 2007/0243278 | A1 | 10/2007 | Anelli et al. |
| 2009/0034027 | A1* | 2/2009 | Yoshimoto et al. ........... 358/496 |
| 2010/0110435 | A1 | 5/2010 | Onishi |
| 2010/0245950 | A1 | 9/2010 | Osakabe |
| 2013/0135426 | A1* | 5/2013 | Wakayama .................... 347/264 |

FOREIGN PATENT DOCUMENTS

| JP | 2008-254221 A | 10/2008 |
| JP | 2008-281549 A | 11/2008 |
| JP | 2010-133915 A | 6/2010 |

OTHER PUBLICATIONS

U.S. Appl. No. 13/683,304, filed Nov. 21, 2012, Masaki Sumioka.
U.S. Appl. No. 13/683,328, filed Nov. 21, 2012, Takeshi Koda.
U.S. Appl. No. 13/683,392, filed Nov. 21, 2012, Daigo Kuronuma.
U.S. Appl. No. 13/683,423, filed Nov. 21, 2012, Naoki Wakayama.
U.S. Appl. No. 13/683,450, filed Nov. 21, 2012, Masaki Sumioka.
Canon Inc., imageRUNNER Advance 6075/6065/6055 Quick Reference, 2010, pp. 45-46, Tokyo JP.

* cited by examiner

*Primary Examiner* — Charlotte M Baker
*Assistant Examiner* — Rury Grisham
(74) *Attorney, Agent, or Firm* — Canon USA Inc IP Division

(57) ABSTRACT

A pressing unit configured to press a supporting surface for supporting a sheet, and a carriage configured to hold a sensor unit and to move on the pressing unit are integrated into one unit. There is provided a movement mechanism configured to move the unit between a first position in which the pressing unit presses the supporting surface during reading and a second position in which the pressing is released during movement of the sheet on the supporting surface.

18 Claims, 22 Drawing Sheets

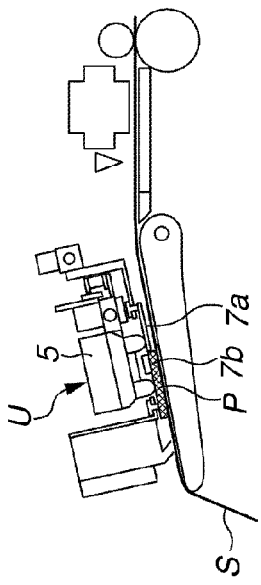 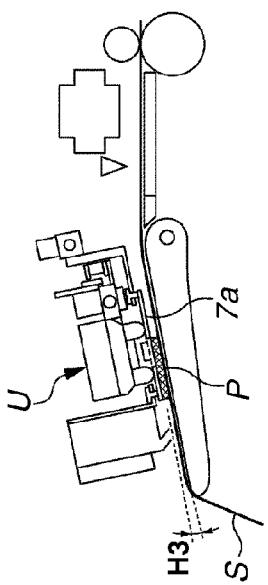 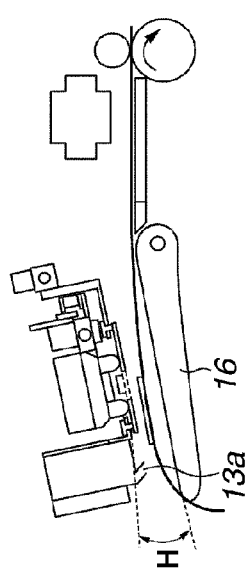
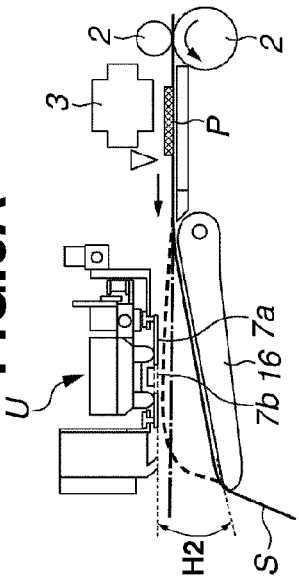 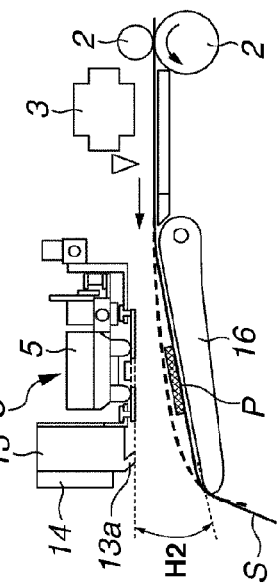 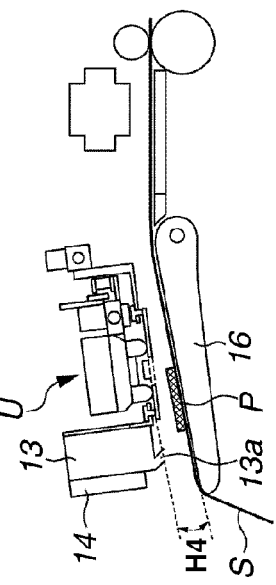

READING APPARATUS AND PRINTING APPARATUS

BACKGROUND OF THE INVENTION

1. Field of the Invention

The present invention relates to a reading apparatus for performing colorimetry of a color pattern formed on a sheet, and a printing apparatus including the reading apparatus.

2. Description of the Related Art

Japanese Patent Application Laid-Open No. 2008-281549 discusses an ink jet printer including a colorimetric apparatus. This colorimetric apparatus performs colorimetry of a printed color pattern for color calibration and, based on colorimetric data, adjusts colors of a color image to be subsequently printed, thus reproducing desired colors. The printer records color patches as a color pattern for color calibration, and then the colorimetric apparatus performs colorimetry of the color patches with a colorimetric sensor moving in the sheet width direction.

With the colorimetric apparatus discussed in Japanese Patent Application Laid-Open No. 2008-281549, with the sheet being pressed by a presser plate, a wheeled carriage on which a colorimetric sensor is mounted runs on the presser plate, and the colorimetric sensor reads color patches, thus performing colorimetry. When the carriage on which the calorimetric sensor is mounted separates from the presser plate, the presser plate rotatably shifts to separate from the sheet.

When performing sheet colorimetry, the colorimetric apparatus discussed in Japanese Patent Application Laid-Open No. 2008-281549 rotatably shifts a presser plate, which is regularly raised, to press a sheet. Subsequently, a carriage on which the colorimetric sensor is mounted moves to the presser plate and then reads the color patches while moving thereabove.

With this configuration, while the carriage exists above the presser plate, it is not possible to rotate the presser plate to retract the carriage. Specifically, to release the pressing by the presser plate to move the sheet, it is necessary to retract the carriage to the outside of the presser plate. The carriage reads the color patches only in the forward path and returns to a home position in the backward path (back feed). Before the carriage completes back feed (backward path) and retracts from above the presser plate to the outside, a following sheet cannot start being moved. This means that the time loss required for back feed disturbs the improvement in reading throughput. In particular, this issue will become distinct when sequentially reading a number of test patterns through repetitive carriage operations.

With the colorimetric apparatus discussed in Japanese Patent Application Laid-Open No. 2008-281549, when the wheel of the carriage runs upon the presser plate, the wheel passes the level difference for the thickness of the presser plate and the impact is transmitted to the carriage. Repetitively applying this impact to the carriage may cause degradation in the attachment accuracy of the colorimetric sensor or a failure of the colorimetric sensor. When the carriage is retracted to the outside of the presser plate, the wheel of the carriage travels on the sheet without the presser plate. Accordingly, when the sheet has a pattern or image printed thereon, the pattern or image may be damaged by the track of the wheel. Each of these factors may cause degradation in reading accuracy.

SUMMARY OF THE INVENTION

An example of the present invention is directed to a reading apparatus capable of achieving both a reduction in the total pattern read time and an improvement in the reading accuracy, and a printing apparatus including the reading apparatus.

According to an aspect of the present invention, a reading apparatus includes: a reading unit including a sensor unit configured to read information on a sheet, a presser plate configured to press a supporting surface for supporting the sheet, and a carriage configured to hold the sensor unit and to move on the presser plate; and a movement mechanism configured to move the reading unit between a first position in which the presser plate presses the supporting surface during reading of the information and a second position in which the pressing is released during movement of the sheet on the supporting surface.

According to an exemplary embodiment of the present invention, the total throughput in the test pattern read sequence is improved, achieving both a reduction in the total pattern read time and an improvement in the reading accuracy. As a result, the calibration time, which is an unproductive time for a user of the printing apparatus, can be shortened. The user can use more time for image printing, which is an intended purpose, thus improving the productivity in printing operations.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A, 6B, 6C, 6D, 6E, and 6F illustrate operating states of the printing apparatus.

DESCRIPTION OF THE EMBODIMENTS

Various exemplary embodiments, features, and aspects of the invention will be described in detail below with reference to the drawings.

Figure 1:
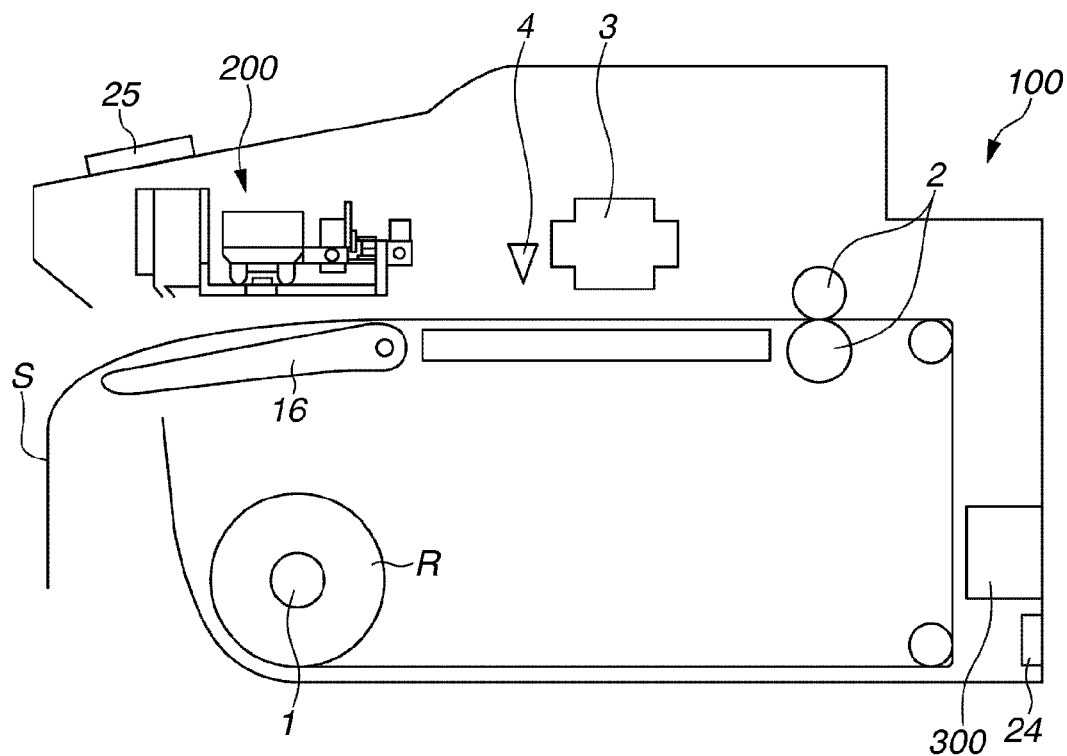
FIG. 1 is a cross sectional view illustrating an overall configuration of a printing apparatus.

An ink jet printing apparatus including a reading apparatus (colorimetric apparatus) according to an exemplary embodiment of the present invention will be described below. FIG. 1 is a cross sectional view illustrating an overall configuration of the printing apparatus. A printing apparatus 100 includes a sheet feed unit 1, a conveyance unit 2, a printing unit 3, a cutting unit 4, a reading unit 200, and a control unit 300.

The sheet feed unit 1 rotatably holds a continuous sheet R wound in roll form. The sheet feed unit 1 pulls out a sheet S from the roll, and a conveyance roller pair of the conveyance unit 2 nips the sheet S and conveys it toward downstream. In the context of the present specification, at any position in the sheet conveyance path, the side toward the sheet feed unit 1 is referred to as "upstream" and the opposite side is referred to as "downstream".

The printing unit 3 includes a plurality of print heads corresponding to a plurality of colors. The printing unit 3 forms an image based either on the serial print process in which a carriage scans the sheet S conveyed in a first direction to make printing for each band, or on the line print process by using line heads. The present exemplary embodiment will be described below based on the serial print process. The plurality of print heads is ink jet print heads, which discharge ink from nozzles based on the ink jet process. The ink jet process may be based on a heater, a piezoelectric element, a micro electromechanical system (MEMS) element, an electrostatic element, and any other devices.

The printing unit 3 can print a test pattern for inspection in addition to a regular desired image on the sheet S. The test pattern refers to a color pattern, such as color patches for color calibration, and a pattern for inspecting any non-discharge state of each nozzle.

The reading unit 200 is disposed downstream of the printing unit 3. The reading unit 200 scans the test pattern formed on the sheet S via a scanner to acquiring color information. The reading unit 200 can be detached from the printing apparatus 100 as one unit.

The cutting unit 4 for cutting the continuous sheet R is disposed between the printing unit 3 and the reading unit 200. The cutting unit 4 cuts an area on the sheet S having the formed test pattern, or cuts a plurality of images printed on the sheet S on an image basis.

A basket-shaped sheet receiving member is disposed at the bottom portion of the printing apparatus 100 which is anterior to the reading unit 200. A sheet discharged after completion of printing or inspection drops into the sheet receiving member by the gravity, and is stacked therein.

The printing apparatus 100 further includes a temperature and humidity sensor 24 for measuring the gas temperature and humidity inside the printing apparatus 100, and an operation unit 25 including input keys for allowing a user to make print setting and a display unit.

The control unit 300 controls the printing apparatus 100 according to the present exemplary embodiment to enable executing not only the regular mode, in which regular image printing is performed, but also the inspection mode, in which a test pattern is printed and inspected for calibration. In the regular mode, the printing unit 3 prints one or a plurality of images on the sheet S, and the cutting unit 4 cuts the plurality of images on the sheet S on an image basis and discharges them. In the inspection mode, the printing unit 3 prints one or a plurality of test patterns on the sheet S, the reading unit 200 reads the test pattern, and the cutting unit 4 cuts the rear end of the test pattern and discharges the sheet S.

Figure 2:
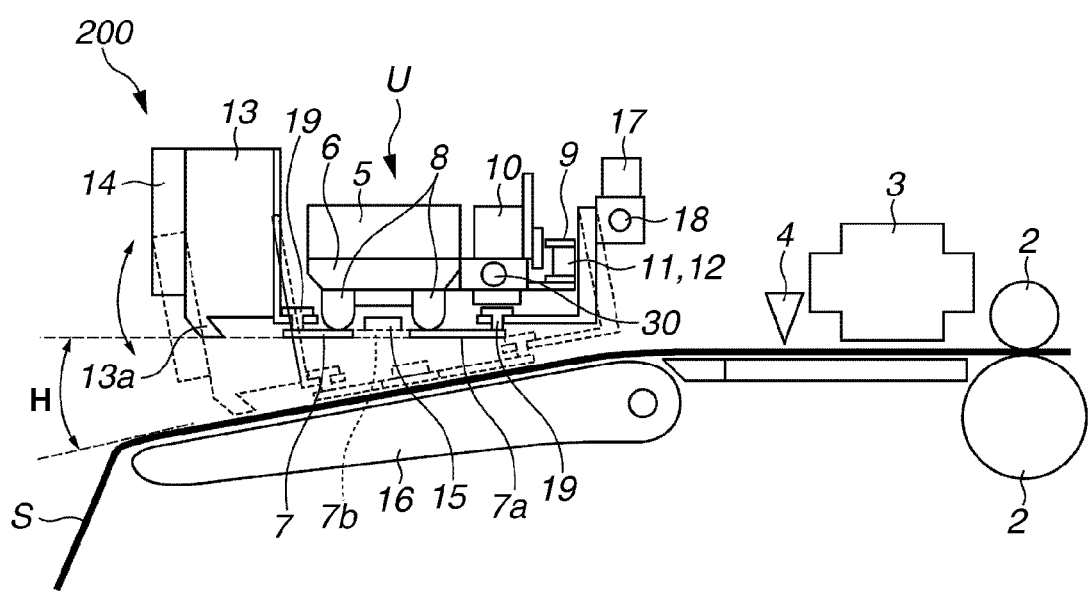
FIG. 2 is a cross sectional view illustrating a detailed configuration of a reading unit.
Figure 3:
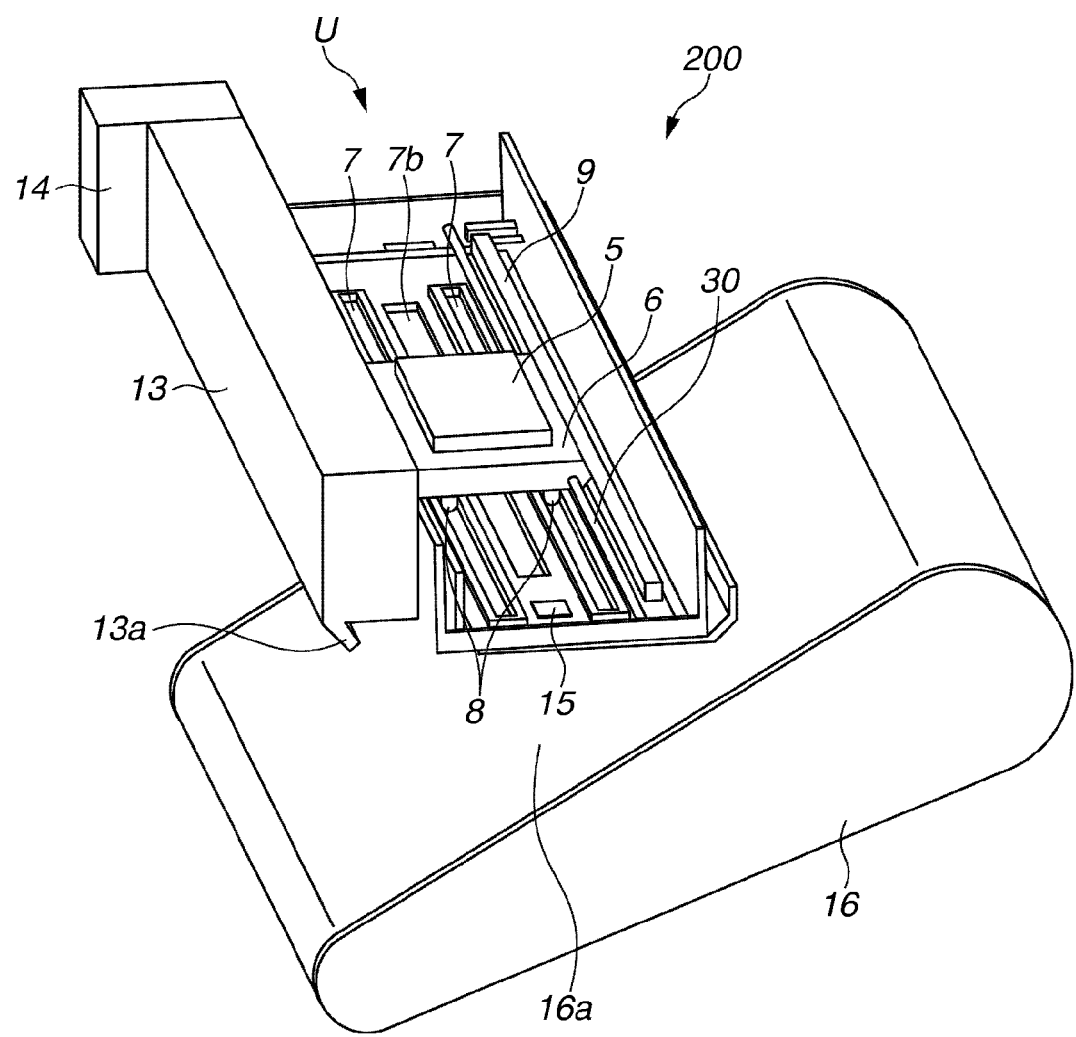
FIG. 3 is a perspective view illustrating an internal configuration of the reading unit.

The configuration and operations of the reading unit 200 according to the present exemplary embodiment will be described in detail below. FIG. 2 is a cross sectional view illustrating an internal configuration of the reading unit 200. FIG. 3 is a partial perspective view illustrating the reading unit 200. In FIG. 3, some members illustrated in FIG. 2 are omitted.

The reading unit 200 includes a scanner unit U and a drying unit in an integrated way. The reading unit 200 can move up and down with respect to a fixed guide 16 fixedly disposed under the reading unit 200. The fixed guide 16 supports the sheet S on a supporting surface 16a (upper surface), which is downwardly inclined toward the downstream side, i.e., a given portion on a more downstream side (discharge side) in the first direction is lower in the gravity direction. The sheet S supported by the supporting surface 16a is subjected to ink drying by the drying unit and scanning by the scanner unit U.

The scanner unit U includes a sensor unit 5 for scanning color information of a test pattern, a carriage 6 supporting the sensor unit 5 and moving along the surface of the sheet S, and a presser plate 7 (pressing unit) for pressing the supporting surface 16a of the fixed guide 16 where the sheet S is supported. These members are integrated into one unit. The bottom surface of the presser plate 7 is a flat pressing surface 7a. The pressing surface 7a and the supporting surface 16a sandwich the sheet S to press and fix it during scanning.

The sensor unit 5 includes a light source and a light-sensitive element. The light source irradiates with light the test pattern formed on the sheet S by the printing unit 3, and the light-sensitive element receives light reflected by the test pattern, from different directions. Information about the density and colors of the test pattern is acquired based on the signal strength of the light-sensitive element.

The carriage 6 reciprocally moves along a second direction perpendicularly intersecting with the first direction (sheet conveyance direction). The range of the reciprocal motion of the carriage 25 covers the sheet width, which is, for example, 60 inches. When the carriage 6 moves, a plurality of contact members 8 disposed on the bottom surface of the carriage 6 contact the upper surface of the presser plate 7. The contact members 8 are driven and rotated rotary bodies, such as wheels, or sliding bodies having a small contact portion frictional resistance. A driving belt 9, a motor 10, a driving pulley 11, and an idler pulley 12 form a drive unit for reciprocally moving the carriage 6. The driving belt 9 is stretched between the driving pulley 11 and the idler pulley 12 along the second direction. A part of the driving belts 9 is fixed to the carriage 6. The drive unit converts the rotation of the motor 10 into the rectilinear motion of the carriage 6. A guide shaft 30 and the presser plate 7 form a guide unit for guiding the motion of the carriage 6 in the second direction. When the carriage 6 reciprocally moves, the contact members 8 contact the upper surface of the presser plate 7, and the inner surface of a guide hole of the carriage 6 contacts the cylindrical surface of the guide shaft 30, thus maintaining the posture of the sensor unit 5. The presser plate 7 is attached to the chassis of the scanner unit U via a coupling member 19, with a predetermined adjustment stroke (play). This enables changing the posture of the surface of the presser plate 7 with respect to the scanner unit U within a range of the adjustment stroke of the coupling member 19.

A slit 7b (an opening oblong along the second direction) is formed in the middle of the presser plate 7. The slit 7b is an opening for allowing passage of light to scan the test pattern. The carriage 6 moves along the longitudinal direction of the slit 7b. The sensor unit 5 irradiates the surface of the sheet S with light through the opening of the slit 7b to detect reflected light. Specifically, a reading position (reading area) of the test pattern exists directly under the slit 7b. In a first alternative embodiment of the present invention, the slit 7b includes a clear member that allows the passage of light but not the passage of ink mist or dust. In a second alternative embodiment of the present invention, the slit 7b is open to the environment such that the sensor unit 5 has an unimpeded and consistent view of the sheet S.

As described above, the presser plate 7 is provided with first and second portions having an oblong shape extending within a predetermined range in a direction parallel to the moving direction of the carriage 6. The first and second portions are disposed so as to sandwich the reading position of the sensor unit 5. The first and second portions may be different portions of one presser plate or portions of two divided plates. The bottom portion of the sensor unit 5 is provided with a first contact member, which contacts the surface of the above-described first portion, and a second contact member, which contacts the surface of the above-described second portion, when the carriage 6 moves.

A color calibration plate 15 is disposed on the outside of one end of the slit 7b. The color calibration plate 15 functions as a reading criterion when performing calibration for temporal change in the reading characteristics of the sensor unit 5 accompanying temperature change and aging. When performing calibration, the carriage 6 moves to a position where the sensor unit 5 faces the color calibration plate 15. The sensor unit 5 detects colors to acquire information about colors and brightness of the color calibration plate 15 based on the detector output.

A movement mechanism 17 enables the reading unit 200 to rotate centering on a rotation shaft 18 disposed upstream of the sensor unit 5. The movement mechanism 17 is provided with a drive unit including a motor and a worm gear. When the drive unit rotates, a wedge-shaped space opening and closing on the downstream side is formed between the pressing surface 7a of the presser plate 7 and the supporting surface 16a of the fixed guide 16. An interval (or an angle) H on the most downstream side of the opening is variable within a range from zero to a predetermined maximum value.

At the time of a read operation, the reading unit 200 is set to a pressing position (referred to as a first position in which the interval H is zero) in which the presser plate 7 presses the supporting surface 16a. On the other hand, at the time of a sheet feed operation or drying operation, the movement mechanism 17 retracts the reading unit 200 to a retracted position (the interval H is larger than zero) in which the pressing by the presser plate 7 is released. The number of retracted positions is not limited to one, and a plurality of retracted positions may be provided: a second position (the interval H is a minimum value H3 larger than zero) suitable for step-feeding the sheet S, a third position (the interval H is an intermediate value H4 between the maximum and minimum values) suitable for drying the sheet S, and a fourth position (the interval H is a maximum value H2) suitable for introducing the leading edge of the sheet S. Specifically, the presser plate 7 is controlled to be set to four different positions (postures). When reading the test pattern, since the presser plate 7 is pressed onto the supporting surface 16a, the slit 7b is completely shut by the fixed guide 16, preventing external light and ink mist from entering the scanner unit U through the slit 7b. Thus, high-accuracy reading is enabled.

To maintain a high reading accuracy with the sensor unit 5, it is desirable to maintain the relative distance and relative angle between the sensor unit 5 and the surface of the sheet S facing it within a predetermined range. Actually, however, the sheet S may absorb moisture in ink or air, thus resulting in waving (cockling). When the sheet S is roll paper, it may have a tendency to be curled. This means that the surface of the sheet S is not necessarily flat. Therefore, during reading, the presser plate 7 presses the sheet S against the supporting surface 16a of the fixed guide 16 to flatten the sheet S. Since the slit formed on the presser plate 7 is an opening, a portion of the sheet S facing the opening cannot be pressed. However, since the width of the slit 7b (in the first direction) is very narrow, pressing the sheet S by both edges of the slit enables sufficiently correcting floated portions of the sheet S in the reading area.

The presser plate 7 is an easily-deformable flexible member made of such a material as an acrylonitrile-butadiene-styrene (ABS) resin or a polycarbonate (PC) resin having a thickness of about 1 to 3 mm to prevent damage to the surface of the sheet S (particularly, a portion on which a test pattern P is formed). On the other hand, the fixed guide 16 is made of a rigid body. The supporting surface 16a of the fixed guide 16 has higher stiffness than the presser plate 7. When the presser plate 7 presses the sheet S, both the sheet S and the presser plate 7 are made into a shape along the surface shape (flat surface) of the fixed guide 16.

If the sheet S is strongly curled or cockled, a part of the flexible presser plate 7 may be lifted by a floated portion of the sheet S, possibly resulting in imperfect adhesion of the sheet S. Even in this case, in the vicinity of portions where the contact members 8 ride on the upper surface of the presser plate 7, the contact members 8 intensively press the presser plate 7 by the sum total weight of the sensor unit 5 and the carriage 6. Therefore, float of the sheet S from the supporting surface 16a is resolved in the vicinity of the reading position. Thus, high reading accuracy is maintained.

Figure 8:
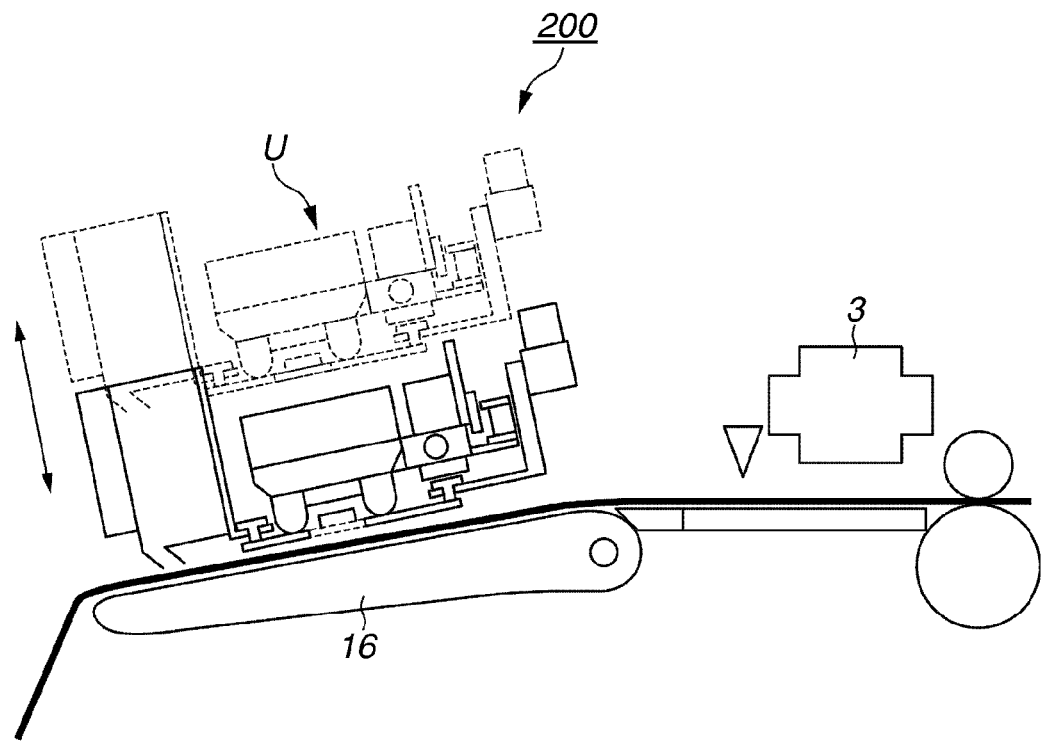
FIG. 8 illustrates a modification in which the reading unit moves up and down in parallel movement.

Although, in the present exemplary embodiment, the interval between the presser plate 7 and the supporting surface 16a is changed by rotating the reading unit 200 around the rotation shaft 18 to change the posture of the reading unit 200, the present exemplary embodiment is not limited thereto. The reading unit 200 may be moved up and down while maintaining the posture of the reading unit 200 constant. Specifically, while constantly maintaining the presser plate 7 in parallel with the supporting surface 16a of the fixed guide 16, the presser plate 7 is moved in the vertical or oblique direction for pressing and retracting. FIG. 8 illustrates an example of modification in which the entire reading unit 200 is moved up and down in an oblique direction, indicated by the arrows, between the first position (solid lines) for the pressing and the second position (broken lines) for releasing the pressing.

The drying unit promotes the dryness of ink applied to the sheet S before reading by the reading unit 200. The drying unit includes a blower unit 14 including a heater and a drying fan, and a duct 13 for sending warm air generated by the blower unit 14 to the surface of the sheet S. The drying unit may not necessarily include both the heater and the drying fan, and may not include either one as long as the drying unit exhibits a required drying capability. The duct 13, as a basic structure constituting the reading unit 200, also serves as a reinforcing member for improving the stiffness of the entire reading unit 200, together with the guide shaft 30. An end of the duct 13 is an air outlet 13a. The air outlet 13a, having a width equal to or larger than the width of the sheet S to be dried, blows off warm air to simultaneously dry the entire area of the sheet S directly under the air outlet 13a.

Figure 4:
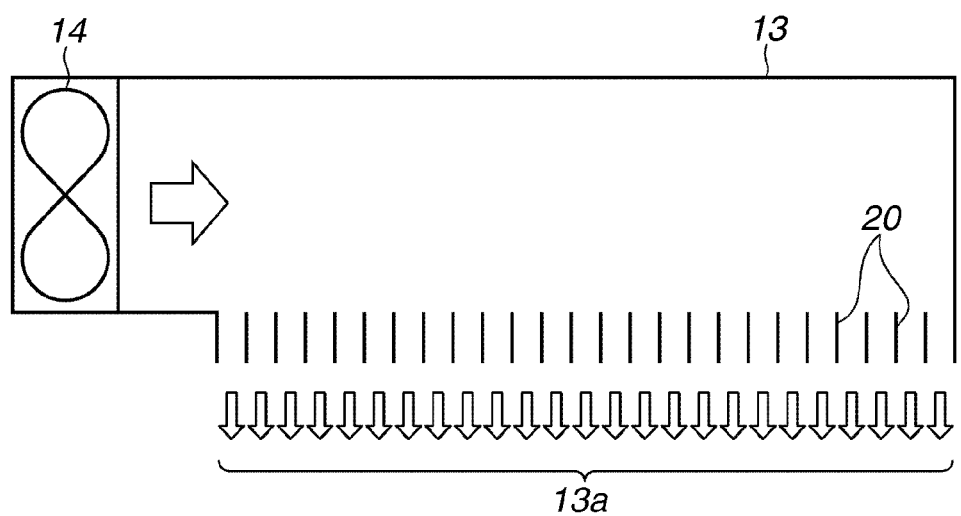
FIG. 4 is a cross sectional view illustrating an internal configuration of a drying unit.

FIG. 4 is a cross sectional view illustrating an internal configuration of the drying unit. Referring to FIG. 4, the horizontal direction refers to the sheet width direction (second direction). The air outlet 13a is a long hole for blowing off air over a range covering the width of the sheet S used. The long hole is provided with a plurality of fins 20 at regular intervals to provide as uniform air volumes in the second direction as possible and stabilize the airflow direction. Warm air generated by the blower unit 14 is straightened by the fins 20 so that air currents are blown off in almost one direction and uniform air volumes are provided (as illustrated by a number of arrows in FIG. 4). Air currents are uniformly blown off on the surface of the sheet S supported on the fixed guide 16 over a range covering the width of the sheet S.

Air currents blown off from the air outlet 13a flow into a closed space in the vertical direction between the presser plate 7 and the supporting surface 16a of the fixed guide 16, from downstream to upstream. Supplying warm air into the closed space in the vertical direction between the fixed guide 16 and the presser plate 7 enables preventing wind speed reduction, thus achieving efficient airflow. In particular, the wedge-shaped space provides a narrower interval on the more upstream side, thus effectively preventing wind speed reduction.

Further, since a portion on the supporting surface 16a of the fixed guide 16 before a portion where the sheet S hangs down from the fixed guide 16 serves as a drying area, the flow of warm air from downstream to upstream effectively dries the sheet S. In the present specification, an area where warm air flows from downstream to upstream along the surface of the sheet S and a desired drying effect is acquired is referred to as an "effective drying area". The length of the effective drying area in the sheet conveyance direction is an integral multiple of (N times) the amount of feed of step-feeding (described below).

The flow of warm air from downstream to upstream of the scanner unit U prevents ink mist (generated in the printing unit 3 on the upstream side) from flowing into the scanner unit U. Thus, the light source and light-sensitive element of the sensor unit 5 are prevented from being stained by ink mist.

Figure 5:
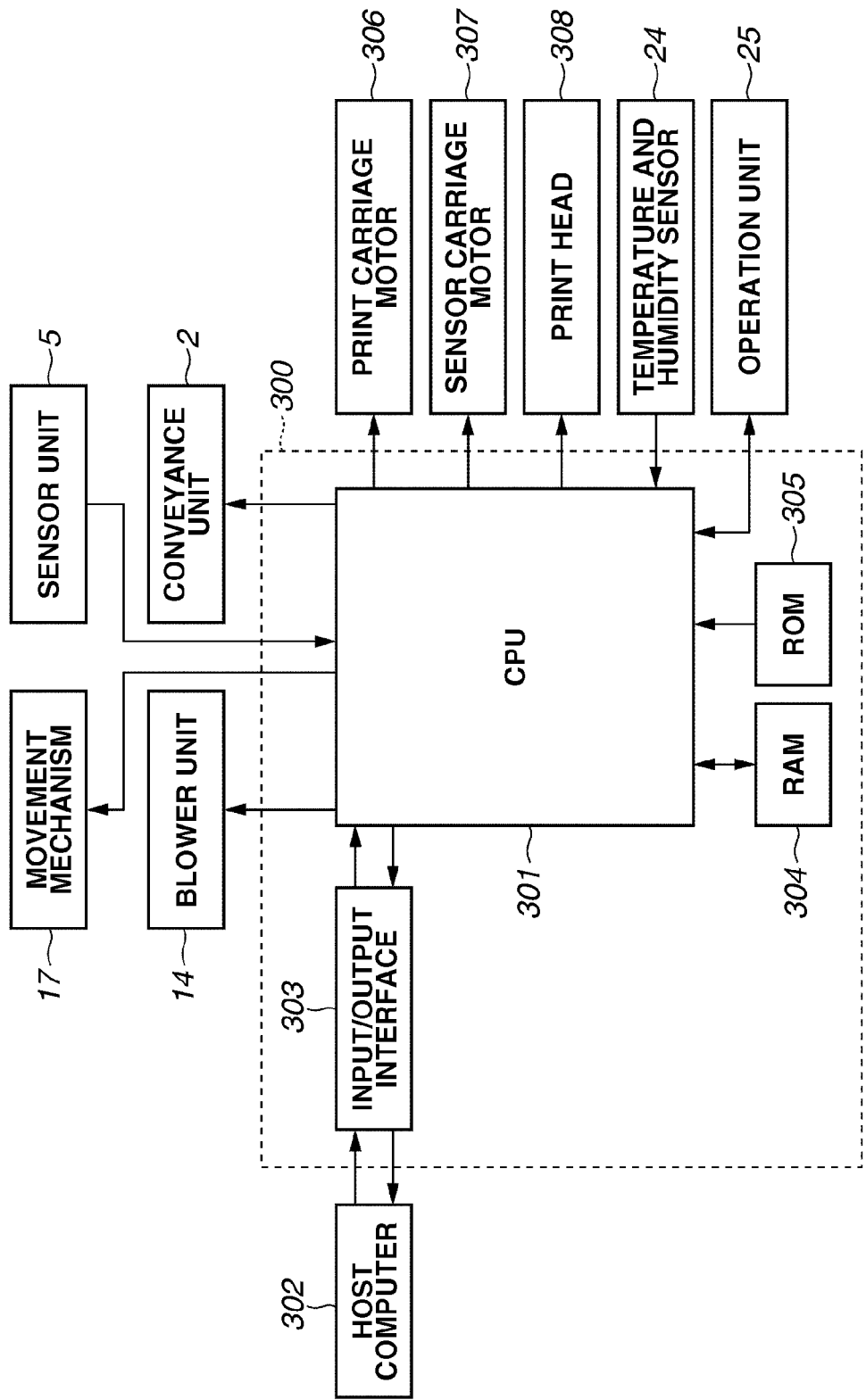
FIG. 5 is illustrates a system configuration centering on a control unit.

FIG. 5 illustrates a system configuration of the printing apparatus 100 according to the present exemplary embodiment centering on the control unit 300. The control unit 300 is a computer system including a central processing unit (CPU) 301, an input/output interface 303, a random access memory (RAM) 304, and a read-only memory (ROM) 305. These elements may be configured as an application specific integrated circuit (ASIC). The CPU 301 totally controls print operations, drying operations, read operations, and calibration operations according to a control program stored in the ROM 305. The RAM 304 is used as a work area by the CPU 301 to perform these operations. The CPU 301 inputs from the host computer 302 print data and various setting information via the input/output interface 303. The CPU 301 inputs and outputs data from/to the operation unit 25. The CPU 301 further individually controls the conveyance unit 2 (drive motor), the drive of the heater and fan of the blower unit 14, the movement mechanism 17 (drive motor), the print carriage motor 306, the sensor carriage motor 307, and the print head 308. The CPU 301 further inputs a signal acquired by the sensor unit 5 and a signal acquired by the temperature and humidity sensor 24, and performs calibration based on the input signals.

Figure 7:
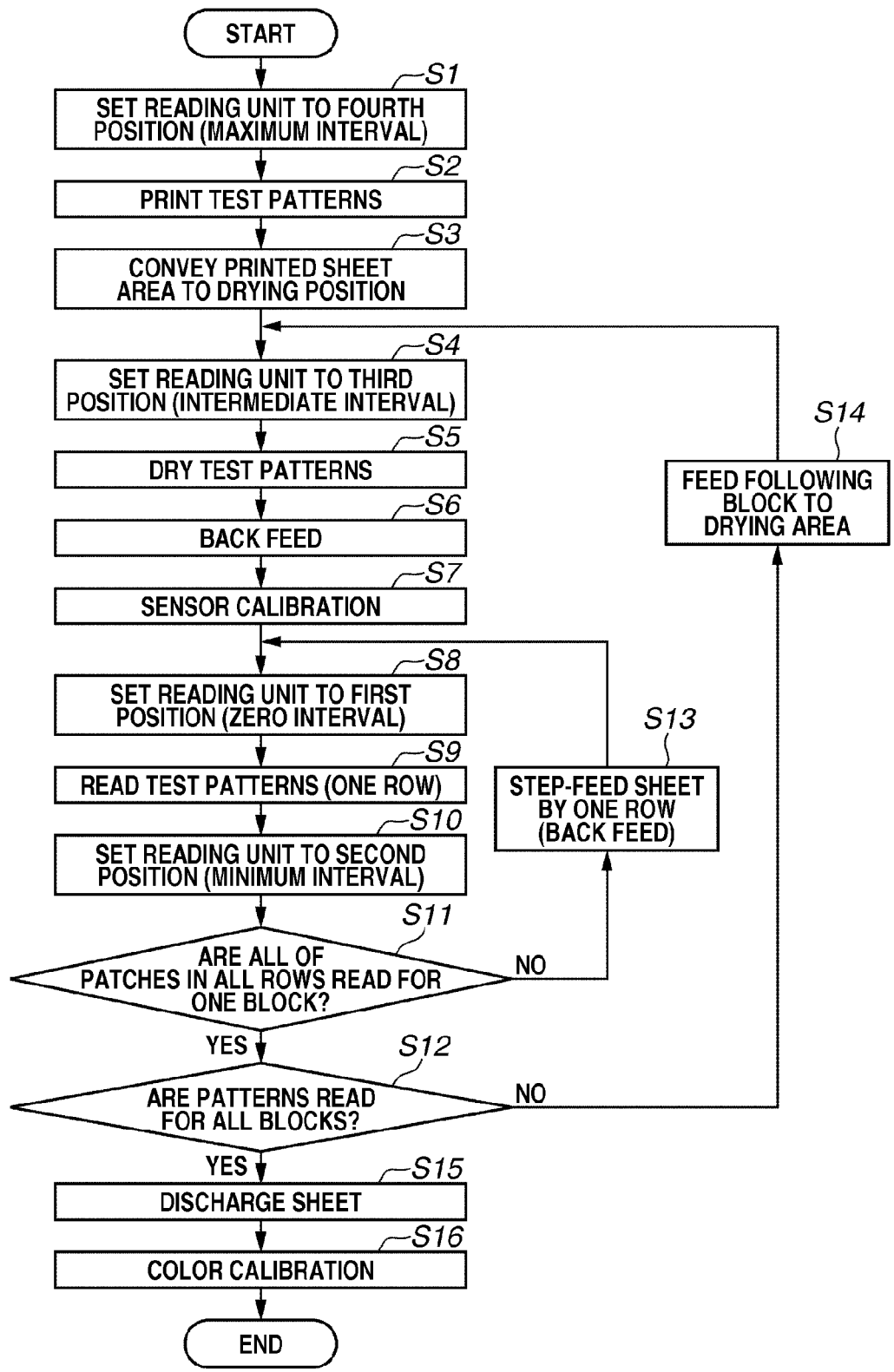
FIG. 7 is a flowchart illustrating an operating sequence of the printing apparatus.

Operations performed by the printing apparatus 100 having the above-described configuration to read a test pattern and perform calibration (color calibration) will be described below. FIGS. 6A, 6B, 6C, 6D, 6E, and 6F illustrate operating states of the printing apparatus 100. FIG. 7 is a flowchart illustrating an operating sequence controlled by the control unit 300.

Roll paper and cut paper can be used for the printing apparatus 100 according to the present exemplary embodiment. In step S1, the CPU 301 sets the reading unit 200 to the fourth position (maximum interval H2), which is the retracted position in which the pressing is released, thus enabling sheet conveyance. Then, the CPU 301 takes a sheet S from a roll R in the sheet feed unit 1, and conveys the sheet S to a position under the printing unit 3 via the conveyance unit 2.

In step S2, the CPU 301 prints an image P (a test pattern) on the sheet S. When the leading end of the image forming area of the sheet S is conveyed to the position under the printing unit 3, the CPU 301 discharges ink from the print head, while reciprocally moving the carriage 6 of the printing unit 3, to print images for one band on the sheet S. The CPU 301 forms the image P (a test pattern for calibration) including a test pattern in a plurality of rows on the sheet S based on the serial print process, in which step-feeding of the sheet S for one band and image printing for one band are alternately repeated. Specifically, while moving the sheet S in the forward direction, the printing unit 3 sequentially prints patch rows included in the test pattern on a row basis.

Thus, the sheet S on which the test pattern is formed is introduced into the reading unit 200, and moves toward downstream, being guided on the supporting surface 16a of the fixed guide 16. When the leading edge of the sheet S passes the fixed guide 16, the sheet S advances toward a portion where the sheet S bends downward and then falls by gravity (as illustrated in FIG. 6A).

There is a case where the leading edge of the sheet S conveyed is strongly curled (as illustrated by a broken line in FIG. 6A). There is another case where the sheet S having high stiffness separates from the supporting surface 16a without being guided according to the fixed guide 16, and then advances almost horizontally (as illustrated by a chain line in FIG. 6A). In particular, immediately after ink application where ink has not yet been dried, the sheet S has a tendency to be strongly curled depending on the amount of ink applied. Although the sheet S is curled downward in the example illustrated by the broken line in FIG. 6A, there is also a case where the sheet S is curled upward. If the sheet S is downwardly curled or if the sheet S horizontally advances, the curled portion of the sheet S may strongly scrape against the pressing surface 7a of the presser plate 7. In this case, the ink of the test pattern which has not yet been sufficiently dried adheres to and stains the pressing surface 7a, or the test pattern may be damaged. If the sheet S is upwardly curled or if the sheet S horizontally advances, the leading edge of the sheet S introduced into the reading unit 200 may enter the slit 7*b*, causing conveyance jam.

To solve these issues, in the present exemplary embodiment, the reading unit 200 is set to the fourth position to extend the interval between the supporting surface 16*a* of the fixed guide 16 and the pressing surface 7*a* of the presser plate 7 to the maximum interval H2. Thus, even in the case of the sheet S as illustrated by the broken line or chain line in FIG. 6A, the above-described issues of abrasion and conveyance jam hardly occur. Of course, the sheet S in the regular condition as illustrated in the solid line does not cause the above-described issues.

In step S3, the CPU 301 conveys the sheet area in which the image P is printed to the effective drying area of the drying unit. Upon completion of the image P print process, the CPU 301 proceeds to the drying process before the image reading process to promote the dryness of ink applied to the sheet S. The CPU 301 performs such a forced drying process to shorten the time until colors of the image P formed on the sheet S are stabilized.

As described above, the reading unit 200 includes the scanner unit U and the drying unit arranged on the downstream side of the scanner unit U. The CPU 301 conveys the sheet S until the rear end area (the last patch row) of the image P formed on the sheet S skips the scanner unit U and reaches the effective drying area of the drying unit (as illustrated in FIG. 6B). As described above, the effective drying area is an area where warm air is applied to the sheet S in the drying process to acquire a desired drying effect. The length of the effective drying area in the sheet conveyance direction is an integral multiple of (N times) the amount of feed of step-feeding (described below). This enables collectively drying a plurality of rows of patches at one time.

In step S4, the CPU 301 changes the reading unit 200 from the fourth position (maximum interval H2) to the third position (intermediate interval H4). At the third position, the interval H4 is suitable for the drying operation to be performed next. The air outlet 13*a* is oriented in such a direction that warm air is blown off toward the upstream side of the conveyance path. Specifically, the drying area includes an area directly under the scanner unit U on the upstream side of the drying unit. Thus, in comparison with a case where the drying area is provided on the downstream side, the amount of escaping warm air is reduced, thus enabling efficiently drying a wide range at one time (as illustrated in FIG. 6C).

In step S5, the CPU 301 forcibly dries the area in which a test pattern is formed. The CPU 301 turns ON the drying fan and the heater included in the blower unit 14. Warm air generated by the blower unit 14 passes through the duct 13 and then is blown off from the air outlet 13*a* onto the sheet S. The image P in a one-block area (for example, an area for three rows of patches) positioned in the effective drying area is forcibly dried. When the time required for drying has elapsed, the CPU 301 turns OFF the drying fan to reduce the output of the fan. The CPU keeps the heater ON. The OFF state refers not only to a state where the rotation of the fan is completely stopped but also to a state where the rotational speed of the fan has decreased to such an extent that vibration is sufficiently reduced.

In step S6, to read the image P, the CPU 301 back-feeds the sheet S in reverse direction. The CPU 301 conveys the sheet S in the reverse direction until the rear end area (a patch row last formed) on the image P reaches the reading position directly under the slit 7*b* of the scanner unit U. If the reading position is included in the effective drying area and the rear end area is positioned at the reading position, this back feed is not required.

In steps S1 to S6, the reading unit 200 is in the retracted state where the presser plate 7 is separated from the supporting surface 16*a* of the fixed guide 16, with different intervals therebetween, and, therefore, the sheet S can freely move within the interval.

In step S7, before reading for colorimetry, the CPU 301 performs sensor calibration for the reading characteristics of the sensor unit 5. Values read by the sensor unit 5 may change depending on the environment and aging, causing changes in colorimetric values. Therefore, prior to actual reading in step S9, the CPU 301 calibrates the sensor unit 5.

Specifically, the CPU 301 moves the carriage 6 to an end of the side on which the color calibration plate 15 is disposed, and detects the optical characteristics (colors) of the color calibration plate 15 via the sensor unit 5. Then, the CPU 301 performs sensor calibration based on the result of the measurement. In sensor calibration, the CPU 301 corrects data of the detection result so that the measurement result at the time of colorimetry of the color calibration plate 15 serves as intended reference values. Alternatively, the luminous intensity of the light sources 18*a* and the gain of the light-sensitive element 18*b* included in the sensor unit 5 may be adjusted so that the intended output values are acquired.

When performing sensor calibration in step S7, the output of the drying fan has decreased in the drying unit. Therefore, the fan does not vibrate when reading the color calibration plate 15, thus enabling reading the color calibration plate 15 with high accuracy. Performing sensor calibration in step S7 during back feed in step S6 enables improving the total throughput. The reading unit 200 may be moved to the first position before step S7.

In step S8, the CPU 301 changes the reading unit 200 from the third position (intermediate interval H4) to the first position (zero interval). The sheet S subjected to pattern reading is pressed between the presser plate 7 and the supporting surface 16*a* of the fixed guide 16 to be securely fixed at the reading position (as illustrated in FIG. 6D).

In step S8, the reading unit 200 rotates centering on the rotation shaft 18 on the upstream side to be lowered. The pressing surface 7*a* of the presser plate 7 contacts the sheet S on the upstream side first, so that the contact surface gradually widens toward downstream. Therefore, the sheet S is fixed between the pressing surface 7*a* and the supporting surface 16*a* of the fixed guide 16, without slack and crease on the sheet S. In addition, since the posture of the pressing surface 7*a* minutely changes according to the supporting surface 16*a* within a range of the adjustment stroke of the coupling member 19, the pressing surface 7*a* and the supporting surface 16*a* closely contact each other across the sheet S.

In step S9, the CPU 301 reads a part (one row) of the test pattern on the sheet S via the scanner unit U. Moving together with the movement of the carriage 6 in the second direction, the sensor unit 5 reads one row in the test pattern on the surface of the sheet S to acquire color information.

In step S10, the CPU 301 changes the reading unit 200 from the first position (zero interval) to the second position (minimum interval H3). The reading unit 200 changes from the pressing state to the retracted state, and the pressing onto the sheet S by the presser plate 7 is released (as illustrated in FIG. 6E). At the second position, the interval H3 is the minimum interval with which to allow sheet conveyance.

At the second position (see FIG. 6E) set in step S10, since the rotation for changing the reading unit 200 from the first position to the second position requires only a short time, a greater number of rows of patches to be repetitively read improves the throughput to a more extent. If the sheet S used is known to have a tendency to be strongly curled, then in step S10, the reading unit 200 may be set to the third position, in which the interval is larger than that at the second position, as illustrated in FIG. 6F. Types of sheets to be used (input by the user from the operation unit 25) and information about the temperature and humidity inside the printing apparatus 100 measured by the temperature and humidity sensor 24 can be used as parameters reflecting the tendency to be curled. The printing duty, printing mode (curling in the high-definition mode in which more ink is applied is larger than curling in the normal mode), and patch arrangement can also be used as parameters. The control unit 300 sets an interval in the retracted state according to these parameters.

In step S11, the CPU 301 determines whether the reading unit 200 has read all of the plurality of rows of patches included in the test pattern of one block dried at once in step S5. When the CPU 301 determines that the reading unit 200 has read all of the plurality of rows of patches (YES in step S11), the processing proceeds to step S12. Otherwise, when the CPU 301 determines that the reading unit 200 has not yet read all of the plurality of rows of patches (NO in step S11), the processing proceeds to step S13.

In step S13, the CPU 301 step-feeds the sheet S by one row in the reverse direction (back feed) so that patches next to the patches in the row last read comes to the reading position. Then, the processing returns to step S8 to repeat the similar sequence. Thus, the CPU 301 reads the test pattern formed in a plurality of rows by repeating the one-row read sequence via the sensor unit and the step-feed (back feed) sequence. In the one-row read sequence, the presser plate 7 and the supporting surface 16a of the fixed guide 16 are pressed on each other. In the step-feed sequence, the pressing is released.

Thus, since the entire reading unit 200 including the presser plate 7 retracts from the sheet S to enable sheet conveyance, the sheet conveyance operation can be started regardless of the position of the carriage 6. After reading the test pattern (step S9) in the forward path of the reciprocally movable carriage 6, performing the operation for returning the carriage 6 to the home position during processing in step S10 (subsequent movement of the reading unit 200) to step S13 (step-feed) will remarkably improve the total throughput. As another method, it is also possible to read the test pattern in each of the forward path and backward path of the reciprocally movable carriage 6. More specifically, the CPU 301 may read one row in the test pattern in the forward path and performs step-feeding, and then reads the next one row in the test pattern in the backward path.

In step S12, the CPU 301 determines whether the reading unit 200 has read all of test patterns for a plurality of blocks constituting the entire test pattern. When the CPU 301 determines that the reading unit 200 has read all of test patterns for the plurality of blocks (YES in step S12), the processing proceeds to step S15. Otherwise, when the CPU 301 determines that the reading unit 200 has not yet read all of test patterns for the plurality of blocks (NO in step S12), the processing proceeds to step S14.

In step S14, the CPU 301 feeds the sheet S until test patterns of the following block reach the effective drying area. Then, the processing returns to step S4 to repeat similar sequence from the step of drying the test pattern for the following block. In the second and subsequent drying sequences, since air dry corresponding to the time period spent in the previous process is added, it is desirable to reduce the drying time or drying capability in consideration of the air dry.

In step S15, the CPU 301 cuts via the cutting unit 4 the sheet S from which all of the blocks have been read, and feeds the sheet S in the forward direction to discharge it to the outside of the printing apparatus 100.

In step S16, the CPU performs color-related calibration processing. The CPU 301 acquires information about colors of the test pattern based on the data obtained in pattern reading in step S8. Then, the control unit performs color calibration for adjusting the amount of ink applied by the print heads for respective colors so that desired colors are reproduced in the final print product.

Meanwhile, the following sheet area to be conveyed to the reading position by step-feeding in step S13 is promoted to be dried by the drying unit before undergoing the read sequence. Although the drying unit reduces the output of the drying fan to reduce vibration, it has drying capability to a certain extent since the heater is operating. Specifically, even during the read and step-feed sequences for one row included in the test pattern, a sheet area including another row to be subsequently read is also forcibly dried.

Vibration of the drying fan may affect the throughput at the time of read sequence. Therefore, reducing the output of the drying fan only during the scanning sequence of the scanner unit U and increasing the output thereof in the step-feed sequence enable improving the total throughput. To further improve the throughput, the drying process may be performed with the maximum capacity even during the scanning sequence of the scanner unit U. In this case, it is desirable that the drying unit uses a low-vibration drying fan or directly irradiates the sheet surface by using an infrared heater generating no vibration.

To achieve suitable drying conditions for the following patch rows during the step-feed and read sequences, it is desirable to perform timer-based management so that the time interval between step-feeding and the following step-feeding may be a predetermined time period T suitable for dying the sheet S. A method for determining the predetermined time T and the processing sequence of a read operation will be described below.

Suppose that one step-feed sequence feeds the sheet S by a distance M, the effective drying area has a length L in the conveyance direction, and one patch is forcibly dried for a total time period K. As described above, L is an integral multiple of M, i.e., $L/M=N$ (N is an integer equal to or larger than 1). By using these parameters, the predetermined time period T is determined as $T=K/N$. The CPU 301 repetitively performs the read processing by using the predetermined time period T determined in this way.

In step S13 (FIG. 7), before the step-feed (back feed) sequence, the CPU 301 waits until a time period counted by a timer reaches the predetermined time period T (wait processing). Specifically, when the CPU 301 starts the processing in step S8, the CPU 301 starts counting a timer included in the control unit 300. Then, when the processing proceeds to step S13 via the processing in steps S9 to S11, the CPU 301 waits until the time period counted by the time reaches the predetermined time period T. When the time period counted by the time reaches the predetermined time period T, the CPU 301 starts the step-feed sequence. As a result of such processing, the total drying time K is reached for each patch included in the test pattern, resulting in a read sequence under suitable drying conditions. Suitably setting the drying capability of the drying unit during the step-feed and read sequences enables performing a required drying sequence in one cycle of the read and step-feed sequences. In this case, the above-described weight processing is not required.

Thus, if suitable drying conditions for the following patch row are obtained during the step-feed and read sequences by introducing timer-based management, the prior drying processing (step S5), the determination processing (step S12), and the feed processing (step S14) in FIG. 7 can be omitted.

Figure 9:
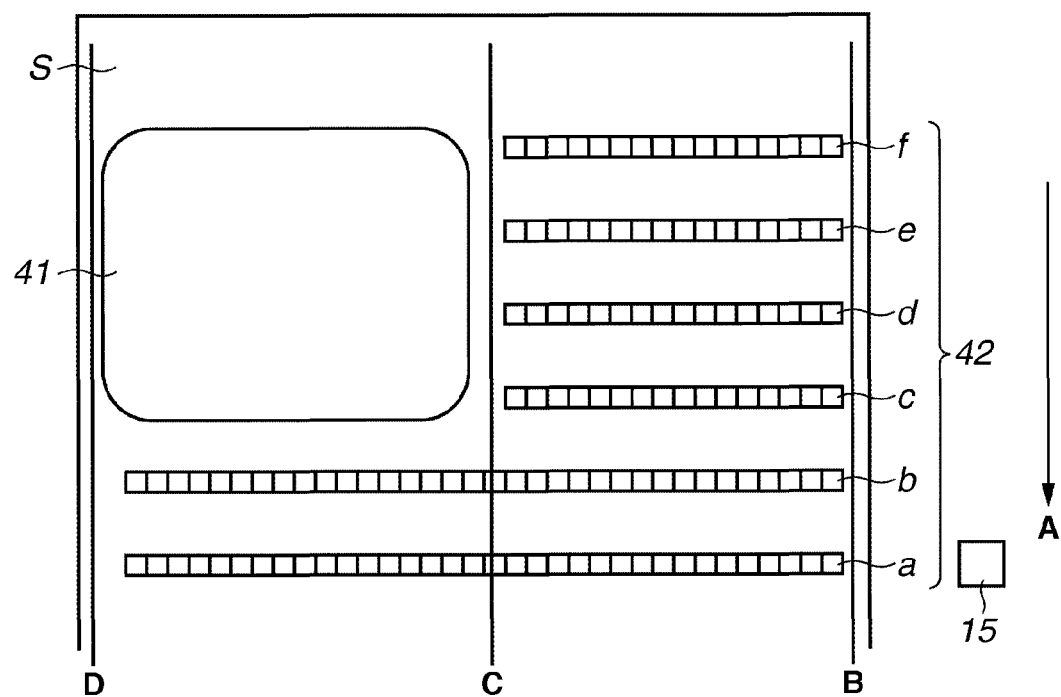
FIG. 9 illustrates an example of a test pattern formed on a sheet.

FIG. 9 illustrates an example of a test pattern formed on the sheet S. The test pattern is formed of a number of color patches 42 and a sample image 41 for comparison before and after color calibration. The layout of the color patches 42 and the sample image 41 can be freely set by the user.

In this example, the color patches 42 are formed in six rows (rows a to f) in a conveyance direction A (back feed direction) of the sheet S. The row f is a patch row on the most downstream side (the leading edge side of a sheet). The printing unit 3 forms the test pattern in order of the rows f to a. The rows a and b are formed almost over the entire sheet width, i.e., a range from position B to position D. Subsequent rows c, d, e, and f are printed over about a half of the sheet width, i.e., a range from position B to position C. The sample image 41 is formed over the remaining sheet width, i.e., a range from position C to position D.

The reading unit 2 reads the color patches 42 formed in this layout in order of the rows a to f one by one, by repeating step-feeding (back feed). The home position of the carriage 6 exists on the position B side.

The sheet S on which the test pattern is formed by the printing unit 3 is back-fed until the first row reaches the reading position directly under the slit 7b. At this time, the reading unit 200 is set to the second position (the pressing released). Subsequently, the CPU 301 sets the reading unit 200 to the first position (pressing position) to press the sheet S between the presser plate 7 and the supporting surface 16a. The CPU 301 reads the patches in the row a one by one from position B to position D via the sensor unit 5 while moving the carriage 6 from position B to position D for scanning. Subsequently, the CPU 301 sets the reading unit 200 to the second position, and then step-feeds the sheet S in the back feed direction by the distance of one patch row. Then, the CPU 301 sets the reading unit 200 to the first position again, and then reads the patches in the row b one by one from position D to position B via the sensor unit 5 while moving the carriage 6 from position D to position B for scanning. When the read sequence for the row b is completed, the CPU 301 sets the reading unit 200 to the second position, and then step-feeds the sheet S in the back feed direction.

The scanning direction of the read sequence alternately changes for each row in this way. As described above, the scanning direction of the read sequence for each patch row may be constantly the same direction (from position B to position D). In this case, the CPU 301 performs the operation for returning the carriage 6 to the home position (on the position B side) while step-feeding the sheet S.

When subsequently reading the patches in the rows c and d, the CPU 301 sets the scanning range to the distance corresponding to the length of each patch row in the sheet width direction. The CPU 301 sets the reading unit 200 to the first position, and then reads the patches in the row c one by one from position B to position C via the sensor unit 5 while moving the carriage 6 from position B to position C for scanning. Subsequently, the CPU 301 sets the reading unit 200 to the second position, and then step-feeds the sheet S in the back feed direction. Then, the CPU 301 sets the reading unit 200 to the first position, and then reads the patches in the row d one by one from position C to position B via the sensor unit 5 while moving the carriage 6 from position C to position B for scanning. When the read sequence for the row d is completed, the CPU 301 sets the reading unit 200 to the second position, and then step-feeds the sheet S in the back feed direction.

Thus, the CPU 301 can shift to the following row without scanning the area of the sample image 41 not subjected to colorimetry, thus improving the reading throughput. Further, since the carriage 6 does not move on the sample image 41, the contact members 8 do not strongly press the sample image 41 via the flexible presser plate 7, thus reducing any damage of the sample image 41.

When subsequently reading the patches in the rows e and f, similar to the above-described sequences, the CPU 301 sets the scanning range to the distance corresponding to the length of each patch row in the sheet width direction. However, in this example, after the read sequence for the row e, the CPU 301 performs sensor calibration processing for maintaining constant the reading characteristics of the sensor, which may change with the temperature. In the sensor calibration processing, the CPU 301 reads the color information for the surface of the color calibration plate 15 via the sensor unit 5, and then adjusts the sensor or corrects the sensor output so that correct results of reading are obtained.

The CPU 301 sets the reading unit 200 to the first position, and then reads the patches in the row e one by one from position B to position C via the sensor unit 5 while moving the carriage 6 from position B to position C for scanning. In this case, the CPU 301 performs the sensor calibration processing before the read sequence for the row f. Since the color calibration plate 15 is disposed on the position B side, it is necessary to move the sensor unit 5 to the color calibration plate 15. The CPU 301 sets the reading unit 200 to the second position, and then moves the carriage 6 from position C to position B, and further up to the color calibration plate 15 outside while step-feeding the sheet S in the back feed direction. Then, the CPU 301 sets the scanner unit U to the first position, and then reads the surface of the color calibration plate 15 via the sensor unit 5 to acquire color information. The control unit 300 performs the sensor calibration processing based on the acquired color information. Upon completion of the sensor calibration processing, similar to the above-described sequences, the CPU 301 reads the patches one by one in the last row f from position B to position C, returns the carriage 25 to the home position, and terminates the series of processing.

Upon completion of the read sequences for all of the patch rows, the control unit 3 performs color calibration for adjusting the amount of ink applied by the print heads for respective colors so that desired colors are reproduced in the final print product.

According to the above exemplary embodiment, the total throughput and reading accuracy in the read sequences for a plurality of rows in a test pattern are improved. Specifically, the present exemplary embodiment achieves both a reduction in the total calibration time and an improvement in the reading accuracy of the reading apparatus. As a result, the calibration time, which is an unproductive time for a user of the printing apparatus, can be shortened. The user can use more time for image printing, which is an intended purpose, thus improving the productivity in printing operations.

Particularly in the present exemplary embodiment, in repetitive read and step-feed (back feed) sequences, during the read and step-feed sequences for one row, a sheet area including another row to be subsequently read is dried by the drying unit. In processing for reading the test pattern by repeating three sequences (dry, read, and step-feed sequences), the read and step-feed processing and the drying processing are performed in parallel, i.e., overlapped in time sequence, thus remarkably improving the total throughput.

Further, in the present exemplary embodiment, there is no conveyance roller on the downstream side of the printing unit 3, and the test pattern is read by repeating the step-feed (back feed) sequence. The test pattern printed by the printing unit 3 is not nipped by the conveyance roller at least until the read sequence by the scanner unit U is completed. Therefore, regardless of the length of the formed test pattern in the conveyance direction, the test pattern is not damaged or the conveyance roller is not stained by ink before reading, thus ensuring high-accuracy read operations for a prolonged period of time.

Further, in the present exemplary embodiment, the reading unit 200 includes the presser plate 7 for pressing the supporting surface 16a supporting the sheet S, and the reciprocally movable carriage 6 for holding the sensor unit 5 on the presser plate 7, the presser plate 7 and the carriage 6 being integrated into one unit. Thus, since the entire reading unit 200 including the presser plate 7 retracts from the sheet S to enable sheet conveyance, the sheet conveyance operation can be started regardless of the position of the carriage 6. This remarkably contributes to an improvement in the total throughput in processing the test pattern by repeating the read and step-feed sequences. In addition, since the carriage 6 is constantly on the presser plate 7 without level differences, no impact occurs while the carriage 6 is moving. Therefore, a sensor failure due to the degraded attachment accuracy of the sensor unit 5 is not likely to occur, thus maintaining high reading accuracy for a prolonged period of time.

Figure 10:
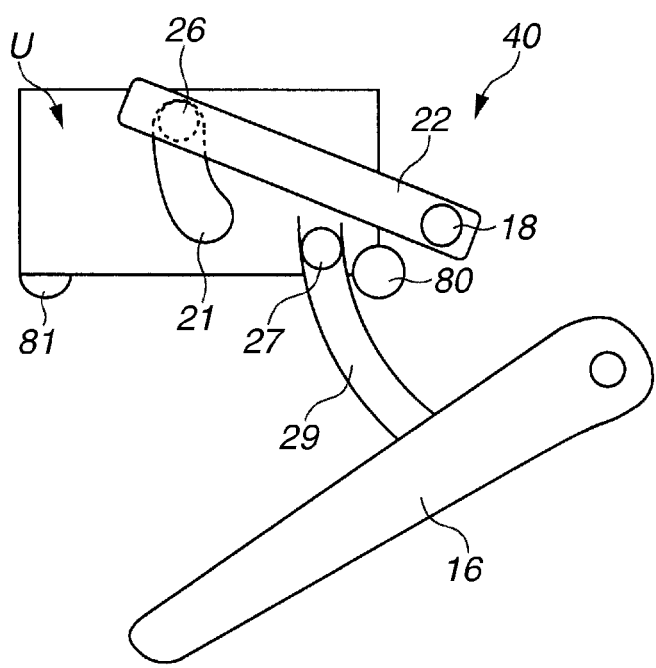
FIG. 10 is a side view illustrating essential portions of a drive mechanism of a colorimetric unit according to a second exemplary embodiment.
Figure 11:
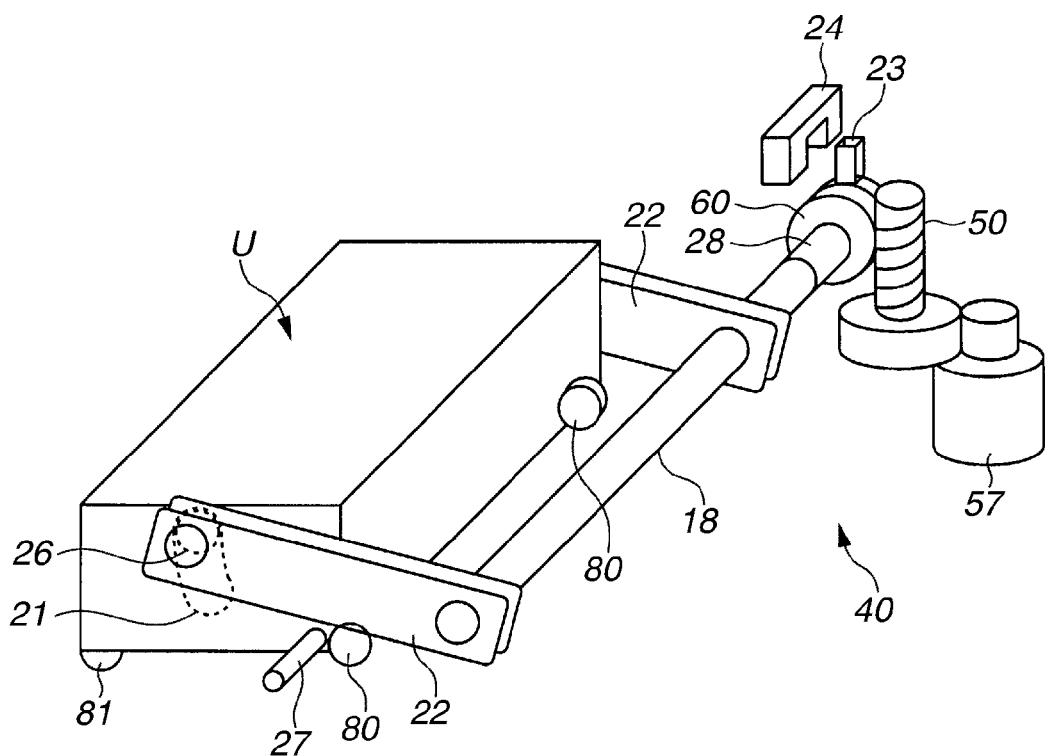
FIG. 11 is a perspective view illustrating an overall configuration of the drive mechanism.

The following describes a drive mechanism of a colorimetric unit U according to a second exemplary embodiment, which is an improved version of the drive mechanism of the scanner unit U according to the first exemplary embodiment. FIG. 10 is a side view illustrating essential portions of the drive mechanism of the colorimetric unit U according to the second exemplary embodiment. FIG. 11 is a perspective view illustrating an overall configuration of the drive mechanism of the colorimetric unit U according to the second exemplary embodiment. The overall configuration of the printing apparatus 100 is similar to that of the first exemplary embodiment illustrated in FIG. 1, and redundant descriptions will be omitted.

FIGS. 10 and 11 illustrate in a simplified way the colorimetric unit U illustrated in FIG. 3. The colorimetric unit U is supported by two arms 22 on both sides in the sheet width direction (see FIG. 11). Specifically, the colorimetric unit U is supported so as to be put by its own weight on support shafts 26 provided at respective arms 22. Each of the arms 22 rotates centering on the rotation shaft 18. The rotation shaft 18 is disposed above a sheet S and upstream of the colorimetric unit U in the sheet conveyance direction, and extends in the sheet width direction. Guide shafts 27 are provided on both side faces of the colorimetric unit U. When the guide shafts 27 slide on guide rails 29 formed in the printing apparatus 100, the rotation track of the colorimetric unit U is regulated (see FIG. 10).

In the present exemplary embodiment, a drive source 57 for generating a force (torque) for driving the colorimetric unit U is configured by using a stepping motor. The force generated by the drive source 57 is transmitted to the colorimetric unit U via a drive mechanism 40. In the present exemplary embodiment, the drive mechanism 40 includes a worm gear 50 and a worm wheel 60 as a lock unit. The drive mechanism 40 further includes a torque limiter 28 as a transmission limiting unit. The torque limiter 28 and the worm wheel 60 are provided at one end of the rotation shaft 18. The worm gearing 50 is engaged with the worm wheel 60 and the drive source 57. An elevating position detection flag 23 indicating the rotational position of the colorimetric unit U is attached to the worm wheel 60. The rotational position of the colorimetric unit U indicated by the elevating position detection flag 23 is detected by an elevating position detection sensor 24. Torque larger than load torque applied by the weight of the colorimetric unit U and inertia during operation stoppage is set to the torque limiter 28. Therefore, during a regular rotational operation, the torque limiter 28 does not rotate and, if excessive torque equal to or larger than a preset value is applied, serves as a damage prevention unit (self-lock unit).

Figure 12A:
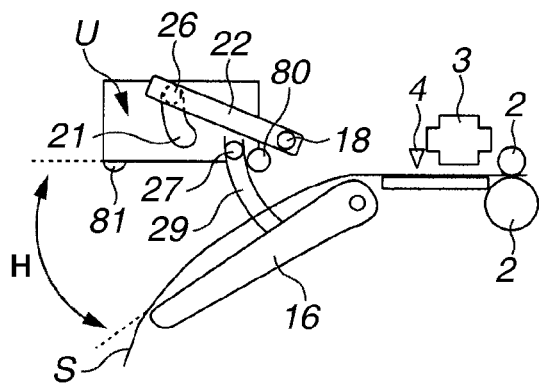
FIGS. 12A, 12B, 12C, 12D, and 12E illustrate operating states of the drive mechanism.
Figure 12B:
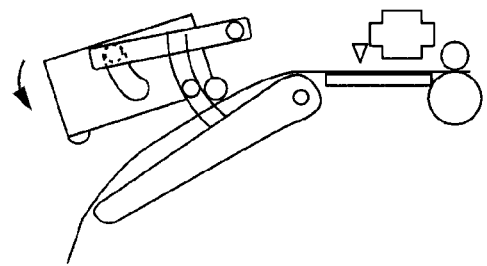
Figure 12C:
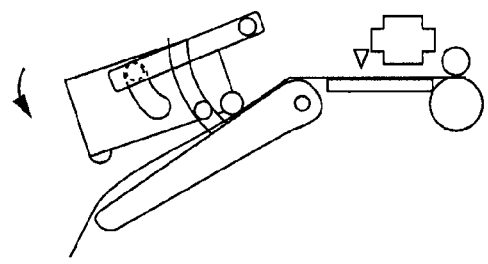
Figure 12D:
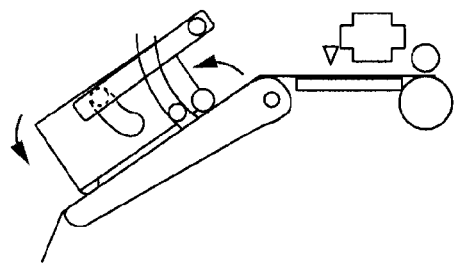
Figure 12E:
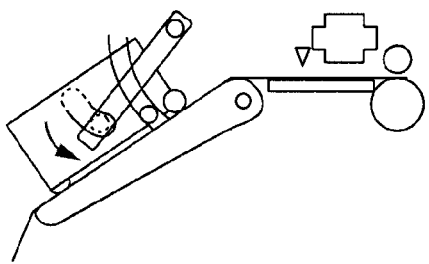

FIGS. 12A, 12B, 12C, 12D, and 12E illustrate operating states of the drive mechanism of the colorimetric unit U illustrated in FIG. 11. FIG. 12A illustrates a state where the colorimetric unit U is retained to the waiting position (second position), in which it is separated from the sheet S and the pressing on the sheet S is released. FIG. 12B illustrates a state where the colorimetric unit U is retained to the intermediate position (third position), in which the color patches 42 printed on the sheet S are dried. FIG. 12C illustrates a state where a first contact portion 80 (pressing unit) of the colorimetric unit U presses the sheet S supported by a sheet discharge guide 16. FIG. 12D illustrates a state where the first contact portion 80 and a second contact portion 81 of the colorimetric unit U are retained in the pressing position (first position), in which they press the sheet S supported by the sheet discharge guide 16. FIG. 12E illustrates a state where the arm 22 is separated from the colorimetric unit U. FIGS. 12A to 12E illustrate the colorimetric unit U in a simplified way. In an embodiment of the present invention, the first contact portion 80 and the second contact portion 81 are rotatable members.

The drive source 57 drives the rotation of the rotation shaft 18. When the colorimetric unit U is raised to the waiting position illustrated in FIG. 12A by the arm 22, the elevating position detection flag 23 blocks the elevating position detection sensor 24 from light.

Then, the drive source 57 drives the rotation of the arm 22 with a predetermined number of pulses. With the guide shaft 27 guided along the guide rail 29, the colorimetric unit U moves down to the intermediate position illustrated in FIG. 12B. The intermediate position illustrated in FIG. 12B is a position suitable for efficiently drying the color patches 42 by air blown off from the drying duct 13. At this time, since the posture of the colorimetric unit U changes by the track of the guide rail 29, the direction of airflow from the drying duct 13 can be set as desired. The lock unit (including the worm gear 50 and the worm wheel 60) enables stopping the colorimetric unit U at any height without exciting the drive source 57. Therefore, the drying time can be reduced by setting an intermediate position in which optimum airflow height and direction are obtained depending on various parameters such as the sheet type, temperature and humidity, and the number of times of drying operations.

Subsequently, when the drive source 57 further drives the rotation of the arm 12 with a predetermined number of pulses, the colorimetric unit U moves down to a position illustrated in FIG. 12C. Then, the first contact portion 80 presses the sheet S supported by the sheet discharge guide 16.

Subsequently, when the drive source 57 further drives the rotation of the arm 12 with a predetermined number of pulses, the colorimetric unit U moves down to a position illustrated in FIG. 12D. Then, the first contact portion 81 presses the sheet 2 supported by the sheet discharge guide 16. Subsequently, as illustrated in FIG. 12E, the arm 22 separates from the colorimetric unit U. Specifically, when a support shaft 26 of the arm 22 moves along a slot 21 formed on each side surface of the colorimetric unit U, the arm 22 moves from the position for supporting the colorimetric unit U to the position for releasing the supporting. Since the arm 22 can be separated from the colorimetric unit U in this way, the colorimetric unit U can certainly adjust to contacting the sheet discharge guide 16 even if the relative position between the colorimetric unit U and the sheet discharge guide 16 is slightly shifted by the members formed between the sheet discharge guide 16 and the colorimetric unit U.

In the present exemplary embodiment, the colorimetric unit U can move up and down over a wide range, greatly separating from the sheet S. Therefore, the sheet S whose leading edge is greatly curled can be conveyed without contacting the colorimetric unit U. The position of the colorimetric unit U with respect to the sheet S is determined via a rotation track regulated by the guide rail 29, thus improving the colorimetric accuracy.

In the present exemplary embodiment, the colorimetric unit U moves down to the pressing position and then the arm 22 separates from the colorimetric unit U. Therefore, even if the sheet conveyance surface is not horizontal (inclined), the colorimetric unit U can adjust to contacting the sheet conveyance surface, accommodating various conveyance angles.

In the present exemplary embodiment, the lock unit (including the worm gear 50 and the worm wheel 60) enables setting any desired airflow direction. Accordingly, the color patches 42 can be dried with an optimum airflow direction and the drying time can be reduced, thus improving the colorimetric throughput.

In the present exemplary embodiment, the first contact portion 80 of the pressing unit presses the sheet S on the upstream side in the sheet conveyance direction, and the second contact portion 81 of the pressing unit presses the sheet S on the downstream side in the sheet conveyance direction. Therefore, in the case of a sheet having a tendency to be curled, such as roll paper, the pressing unit presses the floated sheet so as to be extended in the conveyance direction. Thus, paper float between the colorimetric unit U and the conveyance roller 2 can be reduced, thus improving the colorimetric accuracy.

Figure 13:
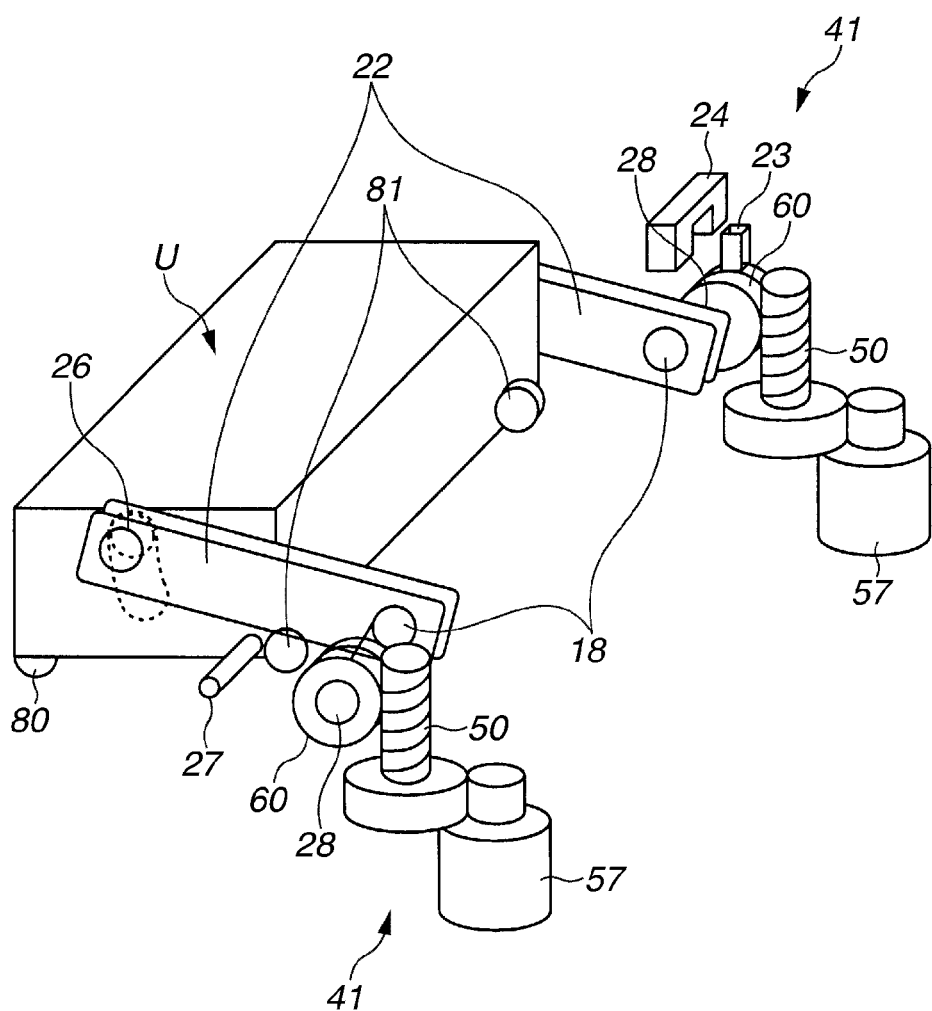
FIG. 13 is a perspective view illustrating an overall configuration of a drive mechanism according to a third exemplary embodiment.

FIG. 13 is a perspective view illustrating an overall configuration of a drive mechanism of the colorimetric unit U according to a third exemplary embodiment. With the above-described drive mechanism 40 according to the second exemplary embodiment, the two arms 22 are connected with the one rotation shaft 18. On the other hand, with a drive mechanism 41 according to the present exemplary embodiment, to prevent shift in relative position between the two arms 22 by the torsion of the rotation shaft 18, a rotation shaft 18 is connected with each of the arms 22. Further, the lock unit (including the worm gear 50 and the worm wheel 60) is provided at one end of each rotation shaft 18, and the drive source 57 is connected to each lock unit. In the present exemplary embodiment, when the CPU 301 synchronously controls the two drive sources 57, the drive mechanism 41 moves the colorimetric unit U up and down in a rotational direction centering on the rotation shafts 18.

According to the present exemplary embodiment, shift in relative position between the two arms 22 can be prevented, resulting in further improved positional accuracy of the colorimetric unit U with respect to the sheet S than in the second exemplary embodiment. Thus, the colorimetric accuracy is further improved.

Figure 14:
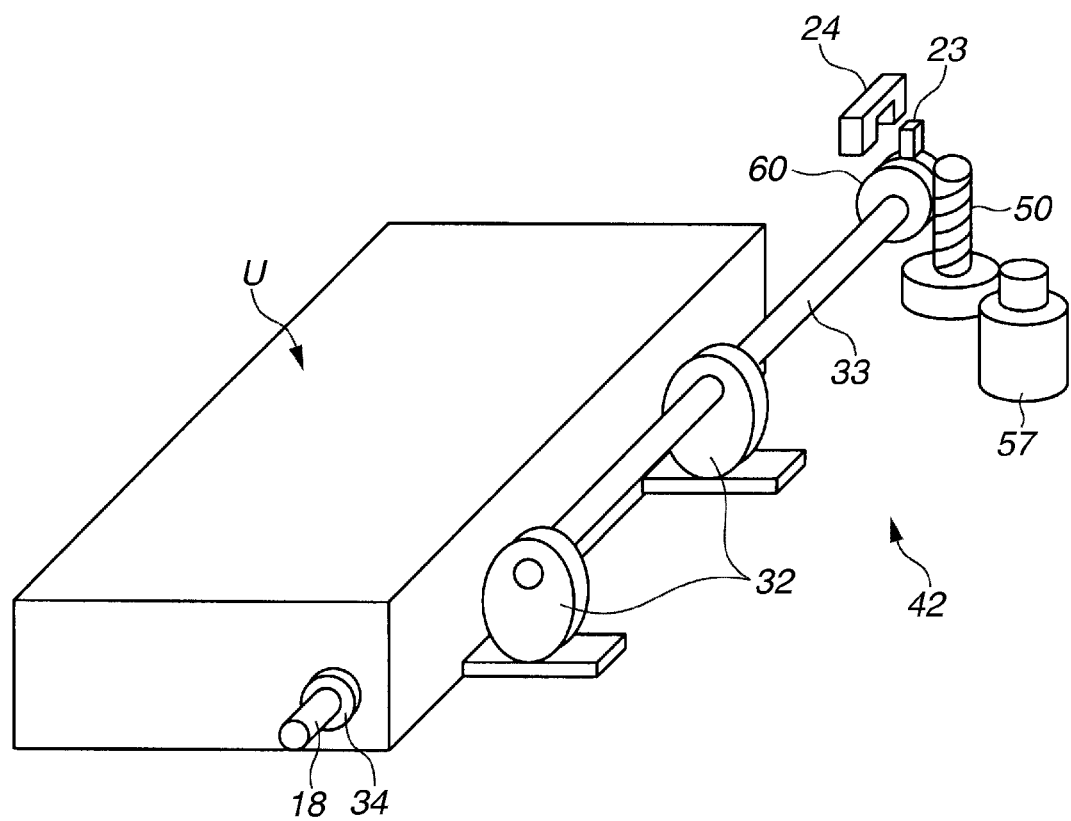
FIG. 14 is a perspective view illustrating an overall configuration of a drive mechanism according to a fourth exemplary embodiment.

FIG. 14 is a perspective view illustrating an overall configuration of a drive mechanism of the colorimetric unit U according to a fourth exemplary embodiment. The colorimetric unit U is supported by the printing apparatus 100 such that the colorimetric unit U can be moved up and down in a rotational direction centering on a rotation shaft 18. With a drive mechanism 42 according to the present exemplary embodiment, a transmission shaft 33 extending in parallel with the rotation shaft 18 is connected with the worm wheel 60. A transmission limiting unit 32 is attached to the transmission shaft 33. Although, in the present exemplary embodiment, the transmission limiting unit 32 includes two cams, the number of cams is not limited thereto. The rotational position of the transmission limiting unit 32 (cams) is indicated by the elevating position detection flag 23, and detected by the elevating position detection sensor 24. When the transmission limiting unit 32 presses the colorimetric unit U with the rotation of the transmission shaft 33, the colorimetric unit U rotates in the same rotational direction as the transmission shaft 33 centering on the rotation shaft 18. A rotational load unit 34 for applying a load to the rotation of the colorimetric unit U (applying a resistance to the elevating operation) is attached to the rotation shaft 18. The rotational load unit 34 includes a spring compressed, for example, in the axial direction.

Figure 15A:
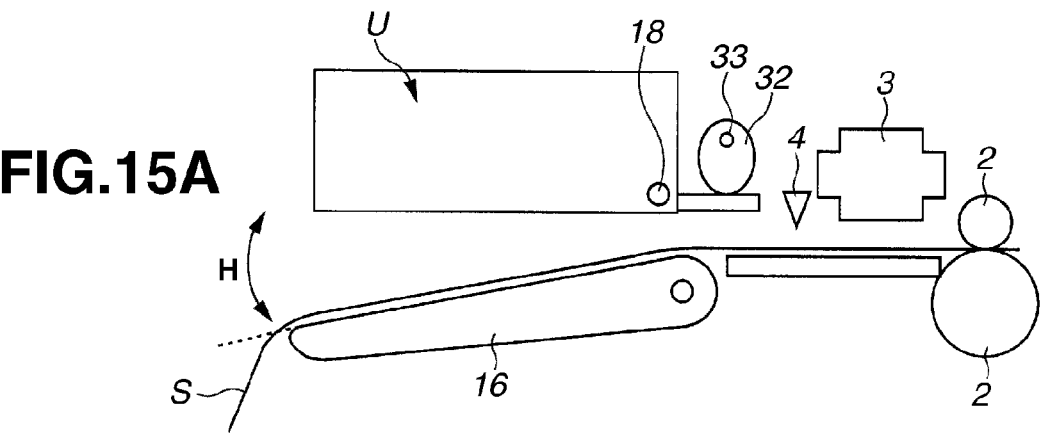
FIGS. 15A, 15B, and 15C illustrate operating states of the drive mechanism.
Figure 15B:
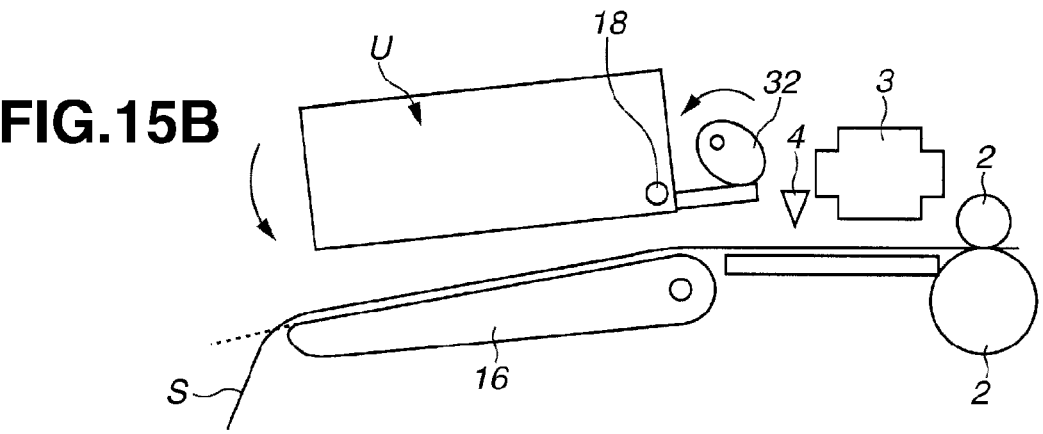
Figure 15C:
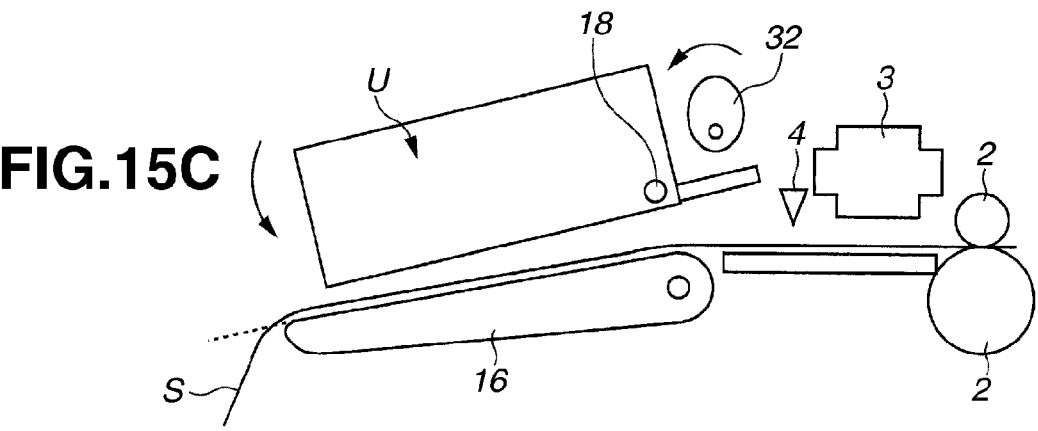

FIGS. 15A, 15B, and 15C illustrate operating states of the drive mechanism 42 illustrated in FIG. 14. FIG. 15A illustrates a state where the colorimetric unit U is retained to the waiting position, in which the elevating position detection flag 23 blocks light of the elevating position detection sensor 24. In the state illustrated in FIG. 15A, the drive source 57 drives the rotation of the transmission limiting unit 32 with a predetermined number of pulses. With the rotation of the transmission limiting unit 32, the colorimetric unit U rotates centering on the rotation shaft 18 to move down to the intermediate position illustrated in FIG. 15B. The intermediate position illustrated in FIG. 15B is a position suitable for efficiently drying the color patches 42 by air blown off from the drying duct 13. In this case, the colorimetric unit U is retained to the intermediate position illustrated in FIG. 15B by the lock unit (including the worm gear 50 and the worm wheel 60) without exciting the drive source 57. Accordingly, the drying time can be reduced by setting an optimum intermediate position depending on various parameters such as the sheet type, temperature and humidity, and the number of times of drying operations.

Subsequently, when the drive source 57 further drives the transmission limiting unit 32 with a predetermined number of pulses, the colorimetric unit U further moves down, as illustrated in FIG. 15C, finally to the pressing position, in which the pressing surface 7a presses the sheet S. While the colorimetric unit U is moving down from the intermediate position to the pressing position, when the force (torque) generated by the drive source 57 reaches a preset specified value, the transmission limiting unit 32 separates from the colorimetric unit U. Accordingly, by increasing the setting of the number of drive pulses of the drive source 57, the colorimetric unit U can certainly contact the sheet discharge guide 16 even if the relative position between the colorimetric unit U and the sheet discharge guide 16 is slightly shifted by the members formed between the colorimetric unit U and the sheet discharge guide 16.

In the present exemplary embodiment, when the colorimetric unit U moves down from the waiting position to the pressing position, the transmission limiting unit 32 separates from the colorimetric unit U and, therefore, the colorimetric unit U does not need to excite the drive source 57 during colorimetry in the pressing position. Therefore, even if the sheet S is pressed by the presser plate in the state of being folded by paper jam or subjected to foreign matter adhesion, the power consumption of the printing apparatus 100 can be restrained.

If the worker raises the colorimetric unit U intending to remove the sheet S in the above-described state and then accidentally drops it, there is a risk that the dropped colorimetric unit U is damaged or the worker is injured. However, the printing apparatus 100 according to the present exemplary embodiment includes the rotational load unit 34 enabling the colorimetric unit U to slowly move down, thus preventing damage to the colorimetric unit U and ensuring the worker's safety.

With the printing apparatus 100 according to the present exemplary embodiment, the lock unit (including the worm gear 50 and the worm wheel 60) enables stopping the colorimetric unit U without exciting the drive source 57. Accordingly, the position of the air outlet 13a can be adjusted to a position suitable for drying the color patches 42, thus reducing the drying time.

Figure 16:
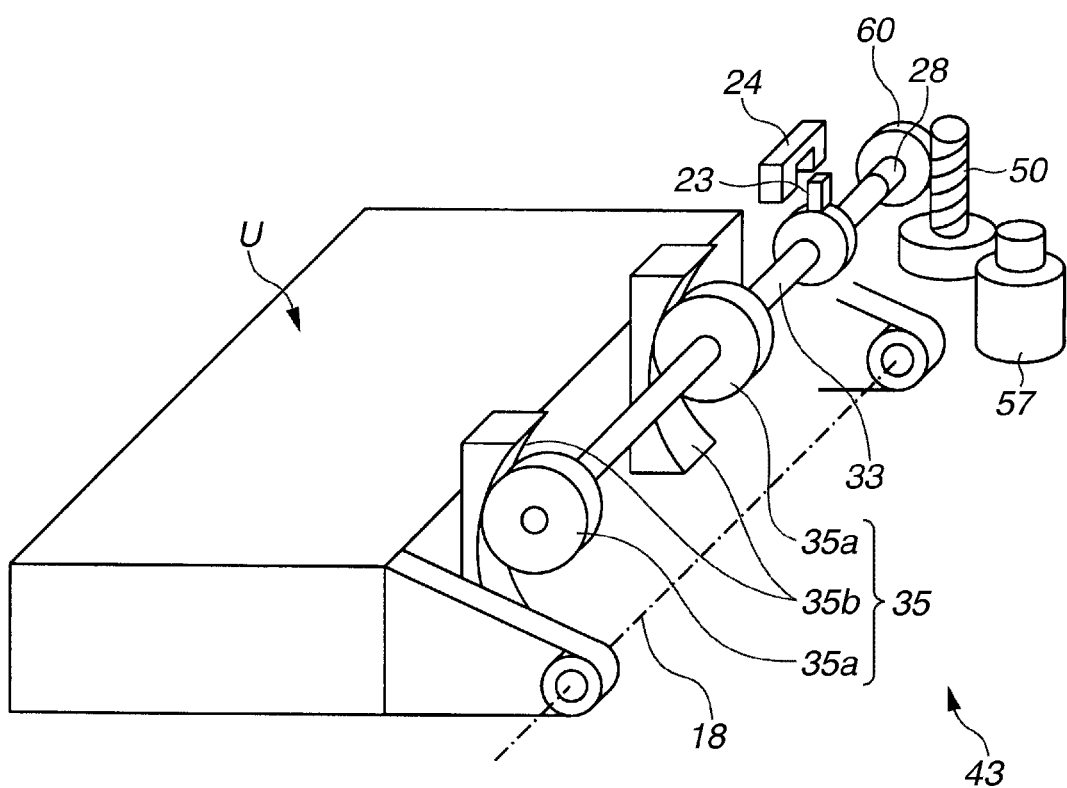
FIG. 16 is a perspective view illustrating an overall configuration of a drive mechanism according to a fifth exemplary embodiment.

FIG. 16 is a perspective view illustrating an overall configuration of a drive mechanism of the colorimetric unit U according to a fifth exemplary embodiment. With a drive mechanism 43, a torque limiter 28 serving as a transmission limiting unit is attached to a transmission shaft 33. A plurality of round gears 35a (counterparts of a plurality of elevating gear pairs 35) is attached to the transmission shaft 33. A plurality of curved gears 35b (counterparts of the plurality of elevating gear pairs 35) is formed on the colorimetric unit U. The gears 35a and 35b are connected with each other. When the gears 35a rotate centering on the transmission shaft 33, the colorimetric unit U rotates in the same direction as the gears 35a centering on the rotation shaft 18.

Figure 17A:
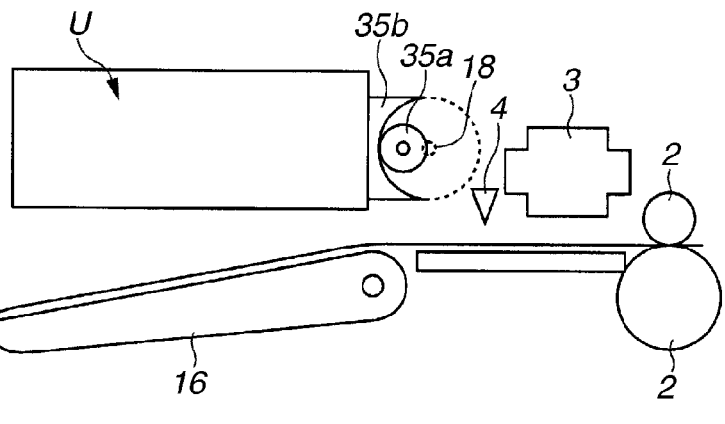
FIGS. 17A, 17B, and 17C illustrate operating states of the drive mechanism.
Figure 17B:
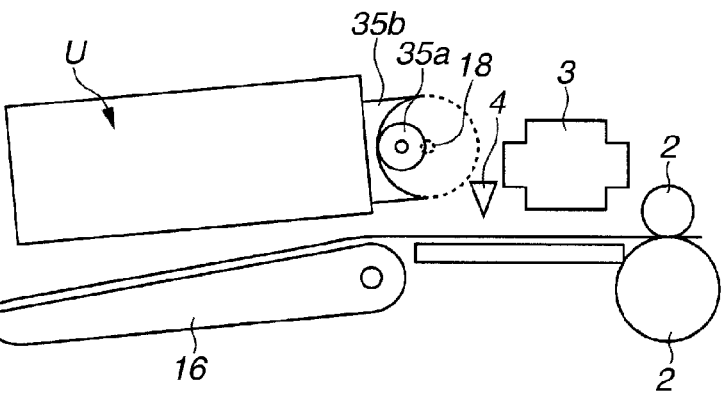
Figure 17C:
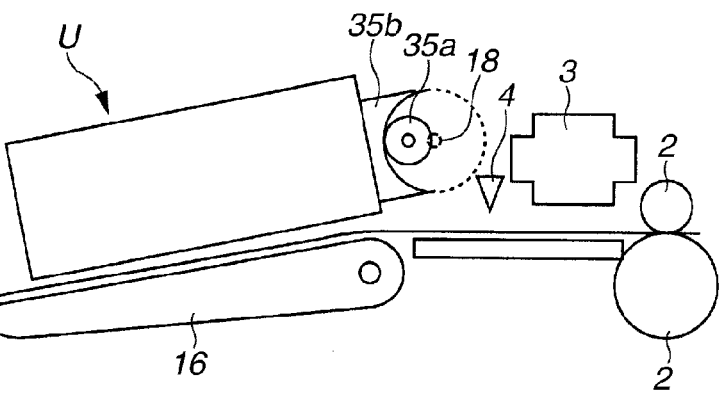

FIGS. 17A, 17B, and 17C illustrate operating states of the drive mechanism 43 illustrated in FIG. 16. Similar to FIG. 15A, FIG. 17A illustrates a state where the colorimetric unit U is retained to the waiting position, in which the elevating position detection flag 23 blocks light of the elevating position detection sensor 24.

In the state illustrated in FIG. 17A, when the drive source 57 drives the rotation of the elevating gear pairs 35 with a predetermined number of pulses, the colorimetric unit U moves down to the intermediate position illustrated in FIG. 17B. The intermediate position illustrated in FIG. 17B is a position suitable for efficiently drying the color patches 42 by air blown off from the drying duct 13. In this case, the colorimetric unit U is retained to the intermediate position illustrated in FIG. 17B by the lock unit (including the worm gear 50 and the worm wheel 60) without exciting the drive source 57. Torque larger than load torque applied by the weight of the colorimetric unit U and the inertia during operation stoppage is set by the torque limiter 28.

Subsequently, when the drive source 57 further drives the transmission limiting unit 32 with a predetermined number of pulses, the colorimetric unit U further moves down, as illustrated in FIG. 17C, finally to the pressing position, in which the pressing surface 7a presses the sheet S. While the colorimetric unit U is moving down from the intermediate position to the pressing position, when the torque generated by the drive source 57 reaches a preset specified value, the torque limiter 28 runs idle and the torque transmission is interrupted. Accordingly, by increasing the setting of the number of drive pulses of the drive source 57, the colorimetric unit U can certainly contact the sheet discharge guide 16 even if the relative position between the colorimetric unit U and the sheet discharge guide 16 is slightly shifted by the members formed between the colorimetric unit U and the sheet discharge guide 16.

In the present exemplary embodiment, when the colorimetric unit U moves down from the waiting position to the pressing position, the torque limiter 28 runs idle. Therefore, the colorimetric unit U does not need to excite the drive source 57 during colorimetry in the pressing position. Therefore, even if the sheet S is pressed by the presser plate in the state of being folded by paper jam or subjected to foreign matter adhesion, the power consumption of the printing apparatus 100 can be restrained.

If the worker raises the colorimetric unit U intending to remove the sheet S in the above-described state and then accidentally drops it, there is a risk that the dropped colorimetric unit U is damaged or the worker is injured. However, the printing apparatus 100 according to the present exemplary embodiment includes the torque limiter 28 enabling the colorimetric unit U to slowly move down, thus preventing damage to the colorimetric unit U and ensuring the worker's safety.

With the printing apparatus 100 according to the present exemplary embodiment, the lock unit (including the worm gear 50 and the worm wheel 60) enables stopping the colorimetric unit U without exciting the drive source 57. Accordingly, the position of the air outlet 13a can be adjusted to a position suitable for drying the color patches 42, thus reducing the drying time.

Figure 18:
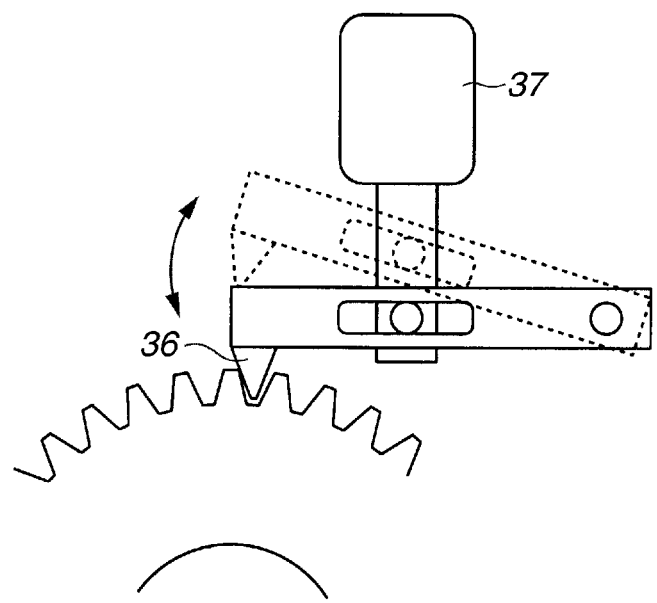
FIG. 18 illustrates a lock unit according to another exemplary embodiment.

In the above-described exemplary embodiments, as the lock unit for retaining the colorimetric unit U to a predetermined position, an electromagnetic clutch may be used instead of the worm gear 50 and the worm wheel 60. In addition, as illustrated in FIG. 18, another lock unit may be used, in which a latch 36 is made movable, by using a solenoid 37, between a position where it is engaged with a gear train and a position where it is separated therefrom.

Figure 19A:
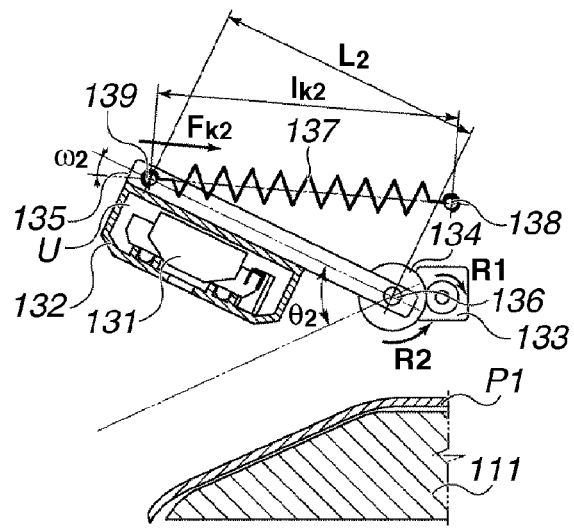
FIGS. 19A, 19B, and 19C illustrate a configuration of a colorimetric apparatus according to a sixth exemplary embodiment.
Figure 19B:
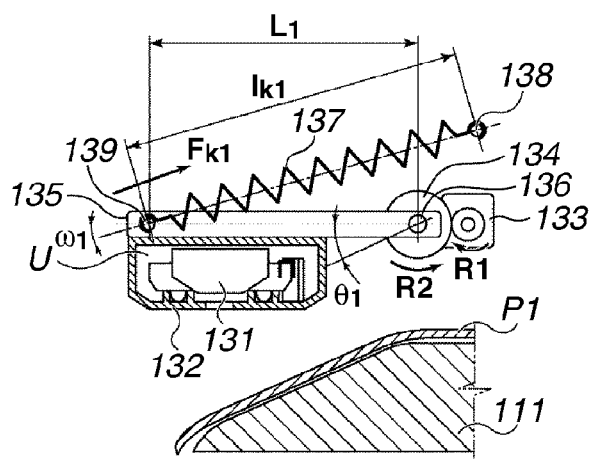
Figure 19C:
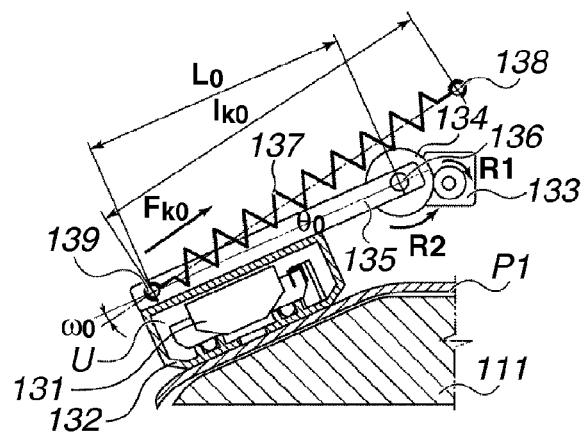

FIGS. 19A, 19B, and 19C are transverse cross sectional views illustrating a configuration of a colorimetric apparatus according to a sixth exemplary embodiment. The overall configuration of the printing apparatus 100 is similar to that of the first exemplary embodiment illustrated in FIG. 1, and redundant descriptions will be omitted. FIG. 19A illustrates a state where the colorimetric unit U for performing colorimetry of a sheet P1 having a printed image is in the retracted position facing a fixed guide 111. FIG. 19B illustrates a state where the colorimetric unit U is in a position between the intermediate and colorimetric positions. FIG. 19C illustrates a state where the colorimetric unit U is in the colorimetric position, in which the colorimetric unit U presses the sheet P1 on the fixed guide 111 to enable performing colorimetry.

The sheet P1 having an image printed by the printing unit disposed on the upstream side in the sheet conveyance direction is discharged onto the fixed guide 111 on the downstream side in the sheet conveyance direction.

In the colorimetric unit U, a colorimetric sensor 131 and a presser plate 132 (pressing unit) are disposed on the downstream side in the sheet conveyance direction. The colorimetric unit U is supported by a support arm 135 rotatable centering on a first rotation shaft 136, which is disposed at a fixed position of the reading unit 200 so as to extend in the sheet width direction. The support arm 135 is connected with a rotation gear 134, which is engaged with a forwardly and reversely rotatable motor 133 having a sensor (not illustrated). The rotation gear 134 is rotatable in any direction by the rotation of the motor 133. As illustrated in FIGS. 19A, 19B, and 19C, when the motor 133 rotates in a rotational direction R1, the colorimetric unit U supported by the support arm 135 rotates in a rotational direction R2 via the rotation gear 134, and, accordingly, the colorimetric unit U moves from the retracted position to the colorimetric position. When the motor 133 rotates in the reverse direction, the colorimetric unit U is movable from the colorimetric position to the retracted position. In other words, the colorimetric unit U is rotatably movable at any angle centering on the first rotation shaft 136 by the motor 133.

The support arm 135 is supported by an elastic member 137 at a spring hooking portion 139, at which a spring is hooked. In the sixth exemplary embodiment, a tension spring is used as an example of the elastic member 137. The elastic member 137 is rotatable centering on a second rotation shaft 138 accordingly with the rotation of the support arm 135 centering on the first rotation shaft 136. Therefore, the support arm 135 can constantly receive the urging force of the elastic member 137. The second rotation shaft 138 is disposed at a fixed position of the reading unit 200 so as to extend in parallel with the first rotation shaft 136 and to raise the colorimetric unit U in a direction (hereinafter referred to as retracted direction) from the colorimetric position to the retracted position in the positional relation with the first rotation shaft 136. For example, the second rotation shaft 138 can be positioned above, in the vertical direction, a line connecting the spring hooking portion 139 (a support point for supporting the colorimetric unit U) and the first rotation shaft 136 when the support arm 135 is in the colorimetric position.

A rotational angle θn of the support arm 135 when the support arm 135 rotates centering on the first rotation shaft 136 will be defined below. The position of the support arm 135 when the colorimetric unit U is in the colorimetric position is set as a zero reference position of the rotational angle θn, and the rotational angle of the support arm 135 in this case is indicated by θ0 (θ0=0 degrees). The rotational angle of the support arm 135 when the colorimetric unit U is in the retracted position is indicated by θ2 (θ2>θ0).

Subsequently, torque required by the motor 133 to raise the colorimetric unit U in the retracted direction by the rotation of the support arm 135 centering on the first rotation shaft 136 will be defined below.

According to the configuration of the present exemplary embodiment, the support arm 135 is subjected to an action of a downwardly acting force based on the sum total gravity of the support arm 135 itself and the colorimetric unit U supported thereby, and to an action of an upwardly acting force (acting in the retracted direction) based on the urging force of the elastic member 137. Then, to raise the colorimetric unit U in the retracted direction, the motor 133 requires torque toward the retracted direction centering on the first rotation shaft 136, obtained by subtracting the torque based on the urging force of the elastic member 137 from the gravity-based torque.

The gravity-based torque refers to torque for resisting the gravity-based downwardly acting force. The gravity-based torque is torque required by the motor 133 to raise the colorimetric unit U via the support arm 135 when a similar configuration to the present exemplary embodiment is assumed, except for a case where the elastic member 137 is not provided.

When the support arm 135 is at the position of the rotational angle θn, the gravity-based torque is indicated by Tn. The torque based on the urging force of the elastic member 137 is indicated by Tkn. In this case, the torque actually required by the motor 133 to raise the colorimetric unit U in the retracted direction with the configuration of the present exemplary embodiment where the elastic member 137 is provided is indicated by ΔTn. ΔTn is represented by the following formula (1):

$$\Delta T_n = T_n - T_{kn} \quad (1)$$

Figure 20:
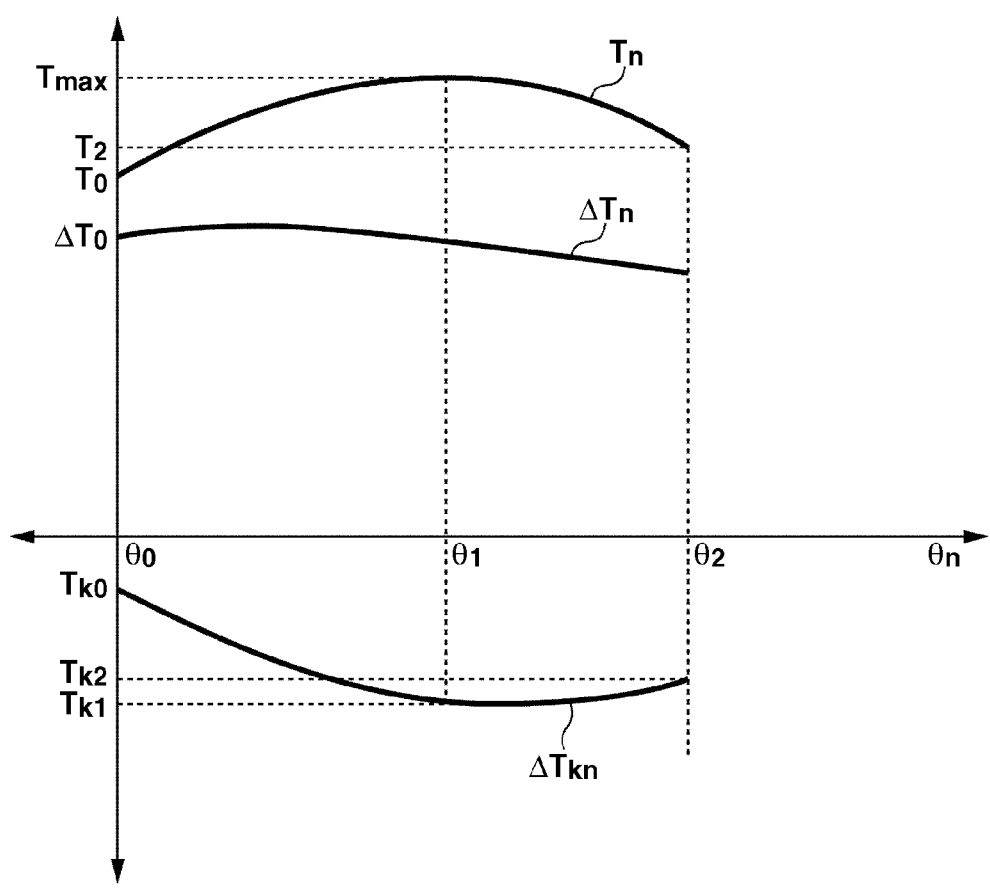
FIG. 20 is a graph illustrating relations between torque.

FIG. 20 is a graph illustrating example relations between torques satisfying the formula (1). Referring to FIG. 20, a relation between torques centering on the first rotation shaft 136 and the rotational angle θn of the support arm 135 will be described below.

The following describes the torque Tn required by the motor 133 to raise the colorimetric unit U via the support arm 135 when a similar configuration to the present exemplary embodiment is assumed, except for a case where the elastic member 137 is not provided. As described above, the torque Tn is based on the sum total gravity of the support arm 135 and the colorimetric unit U supported thereby. The support arm 135 supporting the colorimetric unit U rotates in a circular motion centering on the first rotation shaft 136. In the present exemplary embodiment, the position and magnitude of the mass of the support arm 135 supporting the colorimetric unit U, and the length of the support arm 135 remain unchanged. Therefore, the torque Tn corresponding to the rotational angle θn of the support arm 135 changes in sinusoidal form as illustrated in FIG. 20 according to a general physical formula that multiplies a component force of gravity in the tangential direction of the circle, by the distance.

The torque Tkn based on the urging force of the elastic member 137 when the support arm 135 is at the position of the rotational angle θn will be described below.

In the colorimetric position illustrated in FIG. 19C in which the rotational angle of the support arm 135 is θ0, the support arm 135 receives an urging force Fk0 of the elastic member 137 in a direction indicated by an arrow corresponding to a line connecting the center of the second rotation shaft 138 and the spring hooking portion 139. A straight line connecting the center of the second rotation shaft 138 and the spring hooking portion 139 intersects with a straight line connecting the center of the first rotation shaft 136 and the spring hooking portion 139 to form an angle ω0. The distance between the center of the first rotation shaft 136 and the spring hooking portion 139 is indicated by L0. In this case, the torque Tk0 produced with respect to the first rotation shaft 136 centering on the first rotation shaft 136 based on the urging force Fk0 of the elastic member 137 is represented by a formula that multiplies a component force of the urging force Fk0 of the elastic member 137 in the tangential direction for a circle traced by the support arm 135 when the first rotation shaft 136 rotates, by the distance L0. The torque Tk0 is represented by the following formula (2):

$$T_{k0} = F_{k0} \times \sin \omega_0 \times L_0 \quad (2)$$

Also in the retracted position illustrated in FIG. 19A in which the rotational angle of the support arm 135 is θ2, the support arm 135 receives an urging force Fk2 of the elastic member 137 in a direction indicated by an arrow corresponding to a line connecting the center of the second rotation shaft 138 and the spring hooking portion 139. A straight line connecting the center of the second rotation shaft 138 and the spring hooking portion 139 intersects with a straight line connecting the center of the first rotation shaft 136 and the spring hooking portion 139 to form an angle ω2. The distance between the center of the first rotation shaft 136 and the spring hooking portion 139 is indicated by L2. In this case, the torque Tk2 produced with respect to the first rotation shaft 136 centering on the first rotation shaft 136 based on the urging force Fk2 of the elastic member 137 is represented by a formula that multiplies a component force of the urging force Fk2 of the elastic member 137 in the tangential direction for a circle traced by the support arm 135 when the first rotation shaft 136 rotates, by the distance L2. The torque Tk2 is represented by the following formula (3):

$$T_{k2} = F_{k2} \times \sin \omega_2 \times L_2 \quad (3)$$

Thus, the torque Tkn produced with respect to the first rotation shaft 36 based on the urging force Fkn of the elastic member 137 at any rotational angle θn from the colorimetric position to the retracted position can also be calculated by applying a similar formula.

FIG. 20 illustrates example relations between the torque Tn, the torque Tkn, and torque ΔTn (a difference between the torques Tn and Tkn) actually required by the motor 133, which can be calculated as described above.

A technical concept of the present exemplary embodiment will be described below. The present exemplary embodiment has been devised in view of an issue in a configuration in which an urging unit is used to reduce the elevating power. Specifically, there is a case where, in the colorimetric position in which colorimetry is performed, a predetermined pressing force for pressing a sheet while raising the colorimetric unit by the urging force of an urging unit cannot be acquired. The present exemplary embodiment resolves this issue by setting a reaction pressing force due to the urging force of the urging unit in the colorimetric position so as not to be the maximum value out of reaction pressing forces produced when the colorimetric unit U rotates between the colorimetric and retracted positions.

The present exemplary embodiment resolves the above-described issue by setting each position so that there exists a position (see FIG. 19B) in which the torque Tn required by the motor 133 to raise the colorimetric unit U in the retracted direction is the maximum value Tmax, between the colorimetric and retracted positions. The position in which the torque Tn is the maximum value Tmax may be identical to the retracted position. In other words, the rotational angle of the support arm 135 for the position in which the torque Tn is the maximum value Tmax is indicated by θ1 (θ0≤θ1≤θ2). In this case, a torque Tk1 based on an urging force Fk1 of the elastic member 137 at the position of the rotational angle θ1 is set so as to be larger than the torque Tk0 based on the urging force Fk0 of the elastic member 137 in the colorimetric position.

Conditions for enabling the above-described settings will be described below.

The torque Tkn based on the urging force of the elastic member 137 at the rotational angle θn of the support arm 135 at which the torque Tn is the maximum value Tmax is represented by the following formula (4):

$$T_{k1} = F_{k1} \times \sin \omega_1 \times L_1 \quad (4)$$

Since the distance Ln between the first rotation shaft 136 and the spring hooking portion 139 is constant regardless of the rotational angle θn of the support arm 135 because of the configuration of the present exemplary embodiment, the following formula (5) is satisfied:

$$L_0 = L_1 = L_2 \quad (5)$$

Further, the elastic member 137 (coil spring) has a variable length because of the configuration of the present exemplary embodiment. When the distance between the second rotation shaft 138 and the spring hooking portion 139 is indicated by lkn, the longer the distance lkn, the larger the provided urging force. The distance lkn serves as a parameter for determining the urging force Fkn. The distances lkn for the rotation angles θ0, θ1, and θ2 are distances lk0, lk1, and lk2, respectively. In this case, relations represented by the following formulas (6) and (7) are satisfied:

$$l_{k0} > l_{k1} \geq l_{k2} \quad (6)$$

$$F_{k0} < F_{k1} \geq F_{k2} \quad (7)$$

Further, as a prerequisite for the present exemplary embodiment, the following formula (8) needs to be satisfied in relation to the torque Tkn based on the urging force Fkn of the elastic member 137:

$$T_{k1} > T_{k0} \quad (8)$$

To satisfy the above-described relational formula (8), the following formulas (9) and (10) are derived:

$$\frac{\sin \omega_1}{\sin \omega_0} > \frac{F_{k0}}{F_{k1}} \quad (9)$$

$$\sin \omega_1 > \sin \omega_0 \quad (10)$$

Therefore, the colorimetric apparatus according to the present exemplary embodiment is designed to satisfy all of the relational formulas (8), (9), and (10).

As for the torque Tkn based on the urging force Fkn of the elastic member 137 for raising the colorimetric unit U, the torque Tk0 in the colorimetric position becomes relatively smaller than the torque Tk1 in a position, with the rotational angle θ1 of the support arm 135, between the colorimetric and retracted positions.

Since the torque based on the urging force of the elastic member 137 is relatively small in the colorimetric position, the influence of the urging force of the elastic member 137 on the pressing force of the presser plate 132 can be reduced, thus ensuring a predetermined pressing force of the presser plate 132 for pressing the sheet P1.

As for the torque Tn required by the motor 133 to raise the colorimetric unit U in the retracted direction, as a prerequisite for the present exemplary embodiment, the torque T1 equals the maximum value Tmax in a position in which the above-described torque Tk1 is applied, and the torque T0 is relatively smaller than the torque T1 in the colorimetric position. The torque based on the urging force of the elastic member 137 is relatively large in a position in which the torque Tk1 is applied, and relatively small in the colorimetric position. Therefore, the torque ΔTn actually required by the motor 133 to raise the colorimetric unit U in the retracted direction can be maintained small regardless of the rotational angle θn of the support arm 135.

The configuration according to the present exemplary embodiment enables preventing paper float by pressing the sheet P1 by the presser plate 132 while reducing the elevating power of the motor 133 required to move up and down the colorimetric unit U via the urging unit, thus reducing the influence on the colorimetric accuracy. Also when maintaining torque via the motor 133 to ensure a predetermined pressing force while maintaining the colorimetric unit U to a suitable position in the colorimetric position, the power consumption can be reduced or torque maintenance is not required. Further, it becomes unnecessary to prepare a large-scale lock mechanism for fixing the colorimetric unit U, thus reducing the size and weight of the colorimetric apparatus.

FIG. 20 illustrates a relation between torque centering on the first rotation shaft 136 and the rotational angle θn of the support arm 135 with an example of configuration according to the present exemplary embodiment satisfying the above-described relational formulas (1) to (10). Referring to FIG. 20, the torque ΔT0 actually required by the motor 133 to raise the colorimetric unit U from the colorimetric position is a positive value. Therefore, it is turned out that, in the colorimetric position, the colorimetric unit U has a pressing force and will not be raised by the urging force of the elastic member 137. Referring to FIG. 20, it is turned out that the torque ΔTn actually required by the motor 133 to raise the colorimetric unit U in the retracted direction is maintained small regardless of the rotational angle θn of the support arm 135, as described above.

As described above, in the present exemplary embodiment, both the first rotation shaft 136 and the second rotation shaft 138 are disposed at fixed positions of the reading unit 200. Therefore, an intersecting angle ωn formed by the shafts 136 and 138 ranges from 0 to π (0≤ωn≤π) in a broad sense. For example, suppose a case where, for the purpose of reducing the size of the colorimetric apparatus, the first rotation shaft 136 and the 2nd rotation shaft 138 are disposed in the vicinity so that the intersecting angle ωn ranges from 0 to π/2 (exclusive), i.e., 0≤ωn<π/2. In this case, it is necessary to set the relation between the intersecting angle ω0 in the colorimetric position and the intersecting angle ω1 in the position indicating the maximum torque Tmax to "ω1>ω0" so that the above-described relational formulas are satisfied.

Figure 21A:
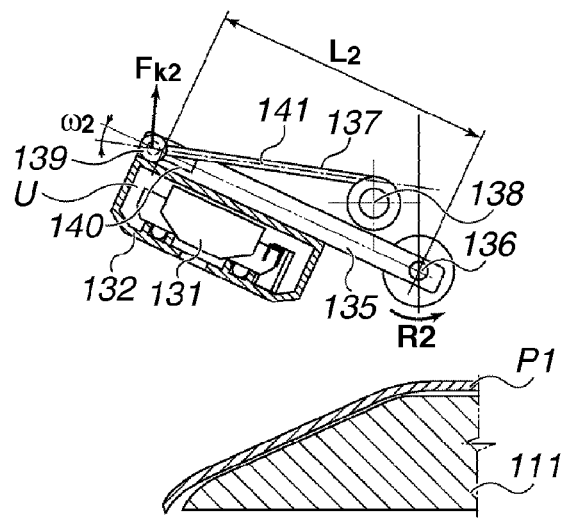
FIGS. 21A, 21B, and 21C illustrate a configuration of a colorimetric apparatus according to a seventh exemplary embodiment.
Figure 21B:
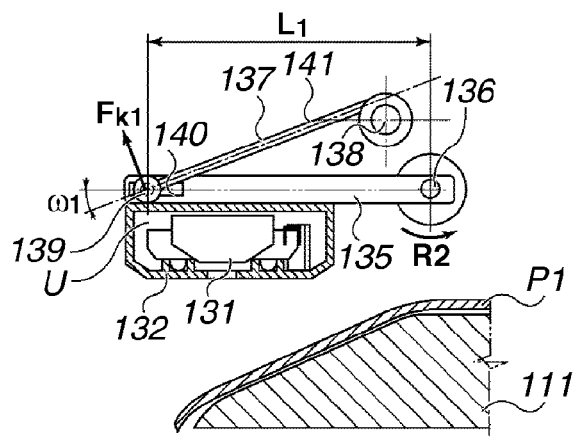
Figure 21C:
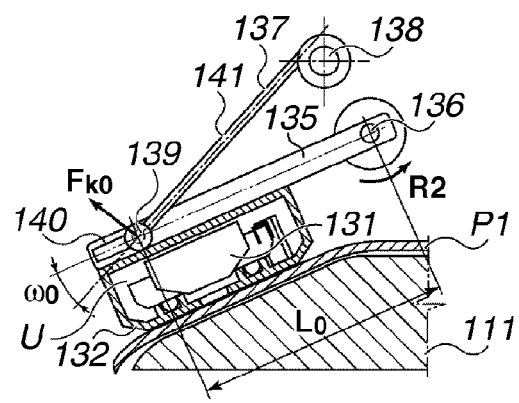

FIGS. 21A, 21B, and 21C are transverse cross sectional views illustrating a configuration of a colorimetric apparatus according to a seventh exemplary embodiment. FIG. 21A illustrates a state where the colorimetric unit U is in the retracted position. FIG. 21B illustrates a state where the colorimetric unit U is in a position between the retracted and colorimetric positions. FIG. 21C illustrates a state where the colorimetric unit U is in the colorimetric position.

Torsion coil springs (torsion springs) are used as the spring members 137. As illustrated in FIGS. 21A, 12B, and 21C, the support arm 135 is provided with a guide portion 140, and the spring hooking portion 139 is slidable on the guide portion 140. As the support arm 135 rotates centering on the first rotation shaft 136, the spring hooking portion 139 fixed to the elastic member 137 slides on the guide portion 140, thus enabling the elastic member 137 to rotate accordingly.

In the colorimetric position illustrated in FIG. 21C, the support arm 135 receives an urging force Fk0 of the elastic member 137 in a direction indicated by an arrow. In this case, a straight line connecting a spring base 141 of the elastic member 137 between the second rotation shaft 138 and the spring hooking portion 139 intersects with a straight line connecting the first rotation shaft 136 and the spring hooking portion 139 to form an angle ω0. The distance between the first rotation shaft 136 and the spring hooking portion 139 is indicated by L0. In this case, the torque Tk0 produced with respect to the first rotation shaft 136 centering on the first rotation shaft 136 based on the urging force Fk0 of the elastic member 137 is represented by a formula that multiplies a component force of the urging force Fk0 of the elastic member 137 in the tangential direction for a circle traced by the support arm 135 when the first rotation shaft 136 rotates, by the distance L0. The torque Tk0 is represented by the following formula (11):

$$T_{k0} = F_{k0} \times \cos\omega_0 \times L_0 \quad (11)$$

On the other hand, in the retracted position illustrated in FIG. 21A, the support arm 135 receives an urging force Fk2 of the elastic member 137. In this case, a straight line connecting a spring base 141 of the elastic member 137 between the second rotation shaft 138 and the spring hooking portion 139 intersects with a straight line connecting the first rotation shaft 136 and the spring hooking portion 139 to form an angle ω0. The distance between the first rotation shaft 136 and the spring hooking portion 139 is indicated by L2. In this case, the torque Tk2 produced with respect to the first rotation shaft 136 centering on the first rotation shaft 136 based on the urging force Fk2 of the elastic member 137 is represented by a formula that multiplies a component force of the urging force Fk2 of the elastic member 137 in the tangential direction for a circle traced by the support arm 135 when the first rotation shaft 136 rotates, by the distance L2. The torque Tk2 is represented by the following formula (12):

$$T_{k2} = F_{k2} \times \cos\omega_2 \times L_2 \quad (12)$$

The seventh exemplary embodiment also sets each position so that there exists a position (see FIG. 21B) in which the torque Tn required by the motor 133 to raise the colorimetric unit U in the retracted direction is the maximum value Tmax, between the colorimetric and retracted positions. The position in which the torque Tn is the maximum value Tmax may be identical to the retracted position. In other words, the rotational angle of the support arm 135 for the position in which the torque Tn is the maximum value Tmax is indicated by θ1 (θ0<θ1<θ2). In this case, a torque Tk1 based on an urging force Fk1 of the elastic member 137 at the position of the rotational angle θ1 is set so as to be larger than the torque Tk0 based on the urging force Fk0 of the elastic member 137 in the colorimetric position.

Conditions for enabling the above-described settings will be described below.

The torque Tkn based on the urging force of the elastic member 137 at the rotational angle θn of the support arm 135 at which the torque Tn is the maximum value Tmax is represented by the following formula (13):

$$T_{k1} = F_{k1} \times \cos\omega_1 \times L_1 \quad (13)$$

With the configuration according to the present exemplary embodiment, the following formulas (14) and (15) are satisfied:

$$L_2 \geq L_1 > L_0 \quad (14)$$

$$F_{k0} > F_{k1} \geq F_{k2} \quad (15)$$

Further, as a prerequisite for the present exemplary embodiment, the following formula (8) needs to be satisfied:

$$T_{k1} > T_{k0} \quad (8)$$

To satisfy the above-described relational formula (8), the following formulas (16), (17), and (17)' are derived: Specifically, $$T_{k1} > T_{k0}$$

gives $$F_{k1} \times \cos\omega_1 \times L_1 > F_{k0} \times \cos\omega_0 \times L_0$$

i.e., $$\frac{F_{k1} \times L_1}{F_{k0} \times L_0} > \frac{\cos\omega_0}{\cos\omega_1}$$

Therefore, when $$F_{k0} \times L_0 \geq F_{k1} \times L_1,$$

the following formula is given:

$$1 \geq \frac{F_{k1} \times L_1}{F_{k0} \times L_0} > \frac{\cos\omega_0}{\cos\omega_1}$$

i.e., $$1 > \frac{\cos\omega_0}{\cos\omega_1}$$

Therefore, the following formula (16) is derived based on the condition $0 \leq \omega < \pi$:

$$\omega_0 > \omega_1 \qquad (16)$$

Also, when $$F_{k1} \times L_1 > F_{k0} \times L_0,$$

the following cases can be assumed.
In one case:

$$1 \geq \frac{\cos\omega_0}{\cos\omega_1}$$

the following formula is given:

$$\frac{F_{k1} \times L_1}{F_{k0} \times L_0} > 1 \geq \frac{\cos\omega_0}{\cos\omega_1}$$

i.e., $$\cos\omega_1 \geq \cos\omega_0$$

Therefore, the following formula (17) is derived:

$$\omega_0 > \omega_1 \qquad (17)$$

In another case:

$$\frac{\cos\omega_0}{\cos\omega_1} \geq 1,$$

the following formula is given:

$$\frac{F_{k1} \times L_1}{F_{k0} \times L_0} > \frac{\cos\omega_0}{\cos\omega_1} \geq 1$$

i.e., $$\cos\omega_0 \geq \cos\omega_1$$

Therefore, the following formula (17)' is derived:

$$\omega_1 \geq \omega_0 \qquad (17)'$$

The colorimetric apparatus according to the seventh exemplary embodiment is designed to satisfy the relational formulas (8), (16), and (17) or (17)', thus obtaining effects similar to the sixth exemplary embodiment.

Figure 22A:
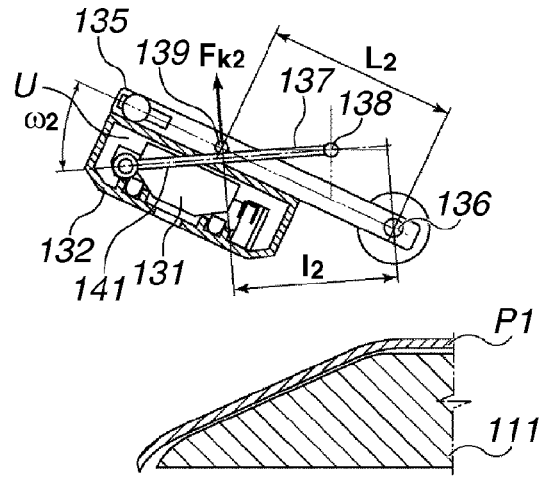
FIGS. 22A, 22B, and 22C illustrate a configuration of a colorimetric apparatus according to an eighth exemplary embodiment.
Figure 22B:
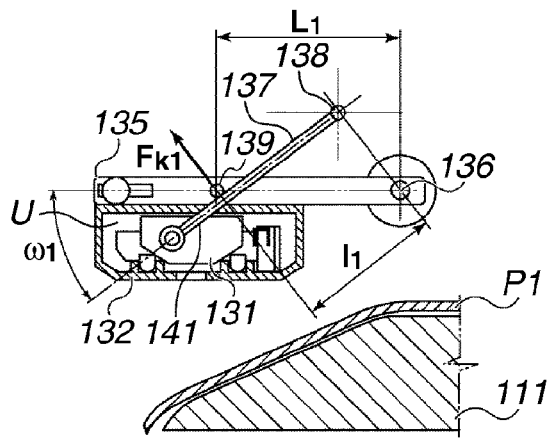
Figure 22C:
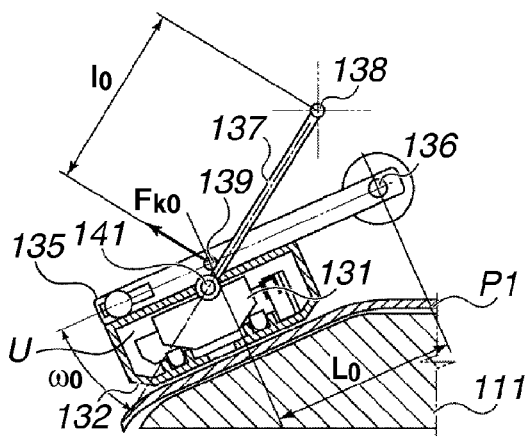

FIGS. 22A, 22B, and 22C are transverse cross sectional views illustrating a configuration of a calorimetric apparatus according to an eighth exemplary embodiment. FIG. 22A illustrates a state where the colorimetric unit U is in the retracted position. FIG. 22B illustrates a state where the colorimetric unit U is in a position between the retracted and colorimetric positions. FIG. 22C illustrates a state where the colorimetric unit U is in the colorimetric position.

The spring hooking portion 139 of the support arm 135 is fixed, and the spring hooking portion 139 is slidable on a spring base 141 of the elastic member 137. As the support arm 135 rotates centering on the first rotation shaft 136, the spring hooking portion 139 slides on the spring base 141, thus enabling the elastic member 137 to rotate accordingly. The distance between the second rotation shaft 138 on the spring base 141 of the elastic member 137 and the spring hooking portion 139 is indicated by ln. The distance ln serves as a parameter for determining the urging force Fkn.

In the colorimetric position illustrated in FIG. 22C, the distance between the second rotation shaft 138 on the spring base 141 of the elastic member 137 and the spring hooking portion 139 is indicated by l0. The support arm 135 receives an urging force Fk0 of the elastic member 137 in a direction indicated by an arrow, i.e., in a tangential direction for a circle traced by the support arm 135 centering on the second rotation shaft 138. A straight line connecting the second rotation shaft 138 and the spring hooking portion 139 intersects with a straight line connecting the first rotation shaft 136 and the spring hooking portion 139 to form an angle ω0. The distance between the first rotation shaft 136 and the spring hooking portion 139 is indicated by L0. In this case, the torque Tk0 produced with respect to the first rotation shaft 136 centering on the first rotation shaft 136 based on the urging force Fk0 of the elastic member 137 is represented by a formula that multiplies a component force of the urging force Fk0 of the elastic member 137 in the tangential direction for a circle traced by the support arm 135 when the first rotation shaft 136 rotates, by the distance L0. The torque Tk0 is represented by the following formula (11):

$$T_{k0} = F_{k0} \times \cos\omega_0 \times L_0 \qquad (11)$$

In the retracted position illustrated in FIG. 22A, the distance between the second rotation shaft 138 on the spring base 141 of the elastic member 137 and the spring hooking portion 139 is indicated by l2. The support arm 135 receives the urging force Fk2 of the elastic member 137. In this case, a straight line connecting the second rotation shaft 138 and the spring hooking portion 139 intersects with a straight line connecting the first rotation shaft 136 and the spring hooking portion 139 to form an angle ω2. The distance between the first rotation shaft 136 and the spring hooking portion 139 is indicated by L2. In this case, the torque Tk2 produced with respect to the first rotation shaft 136 centering on the first rotation shaft 136 based on the urging force Fk2 of the elastic member 137 is represented by a formula that multiplies a component force of the urging force Fk2 of the elastic member 137 in the tangential direction for a circle traced by the support arm 135 when the first rotation shaft 136 rotates, by the distance L2. The torque Tk2 is represented by the following formula (12):

$$T_{k2} = F_{k2} \times \cos\omega_2 \times L_2 \qquad (12)$$

The eighth exemplary embodiment also sets each position so that there exists a position (see FIG. 22B) in which the torque Tn required by the motor 133 to raise the colorimetric unit U in the retracted direction is the maximum value Tmax, between the colorimetric and retracted positions. The position in which the torque Tn is the maximum value Tmax may be identical to the retracted position. In other words, the rotational angle of the support arm 135 for the position in which the torque Tn is the maximum value Tmax is indicated by θ1 ($\theta 0 < \theta 1 \leq \theta 2$). In this case, a torque Tk1 based on an urging force Fk1 of the elastic member 137 at the position of the rotational angle θ1 is set so as to be larger than the torque Tk0 based on the urging force Fk0 of the elastic member 137 in the colorimetric position.

Conditions for enabling the above-described settings will be described below.

The torque Tkn based on the urging force of the elastic member 137 at the rotational angle θn of the support arm 135 at which the torque Tn is the maximum value Tmax is represented by the following formula (13):

$$T_{k1} = F_{k1} \times \cos \omega_1 \times L_1 \quad (13)$$

With the configuration according to the present exemplary embodiment, the following formulas (18) and (19) are satisfied:

$$L_0 = L_1 = L_2 \quad (18)$$

$$l_0 < l_1 \leq l_2 \quad (19)$$

Similar to the sixth and seventh exemplary embodiments, as a prerequisite for the present exemplary embodiment, the following formula (8) needs to be satisfied:

$$T_{k1} > T_{k0} \quad (8)$$

To satisfy the above-described relational formula (8), the following formulas (20), (21), and (21)' are derived: Specifically, $$T_{k1} > T_{k0}$$

gives $$F_{k1} \times \cos \omega_1 \times L_1 > F_{k0} \times \cos \omega_0 \times L_0$$

i.e., $$\frac{F_{k1} \times L_1}{F_{k0} \times L_0} > \frac{\cos \omega_0}{\cos \omega_1}$$

Therefore, when $$F_{k0} \geq F_{k1},$$

the following formula is given:

$$1 \geq \frac{F_{k1}}{F_{k0}} > \frac{\cos \omega_0}{\cos \omega_1}$$

i.e., $$1 > \frac{\cos \omega_0}{\cos \omega_1}$$

Therefore, the following formula (20) is derived based on the condition $0 \leq \omega < \pi$:

$$\omega_0 > \omega_1 \quad (20)$$

Also, when $$F_{k1} > F_{k0}$$

the following cases can be assumed.
In one case:

$$1 \geq \frac{\cos \omega_0}{\cos \omega_1}$$

the following formula is given:

$$\frac{F_{k1}}{F_{k0}} > 1 \geq \frac{\cos \omega_0}{\cos \omega_1}$$

i.e., $$\cos \omega_1 \geq \cos \omega_0$$

Therefore, the following formula (21) is derived:

$$\omega_0 \geq \omega_1 \quad (21)$$

In another case:

$$\frac{\cos \omega_0}{\cos \omega_1} \geq 1$$

the following formula is given:

$$\frac{F_{k1}}{F_{k0}} > \frac{\cos \omega_0}{\cos \omega_1} \geq 1$$

i.e., $$\cos \omega_0 \geq \cos \omega_1$$

Therefore, the following formula (21)' is derived:

$$\omega_1 \geq \omega_0 \quad (21)'$$

Therefore, the colorimetric apparatus according to the eighth exemplary embodiment is designed to satisfy the relational formulas (8), (20), and (21) or (21)', thus obtaining effects similar to the sixth and seventh exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-257427 filed Nov. 25, 2011, No. 2012-009970 filed Jan. 20, 2012, and No. 2012-104178 filed Apr. 27, 2012, which are hereby incorporated by reference herein in their entirety.

What is claimed is:

1. A reading apparatus comprising:
   a reading unit including a sensor unit configured to read information on a sheet, a pressing unit configured to press a supporting surface for supporting the sheet, and a carriage configured to hold the sensor unit and to move on the pressing unit; and
   a movement mechanism configured to move the reading unit between a first position in which the pressing unit presses the supporting surface during reading of the information and a second position in which the pressing is released during movement of the sheet on the supporting surface.

2. The reading apparatus according to claim 1, wherein the movement mechanism rotates the reading unit to move the reading unit between the first position and the second position.

3. The reading apparatus according to claim 1, wherein the movement mechanism moves up and down the reading unit with respect to the supporting surface to move the reading unit between the first position and the second position.

4. The reading apparatus according to claim 2, wherein the supporting surface includes an inclined surface whose downstream side is lowered in gravity direction, and, in the first position, the pressing unit is inclined according to the inclined surface.

5. The reading apparatus according to claim 1, wherein the pressing unit includes first and second portions each extending within a predetermined range in a direction parallel to a moving direction of the carriage, the first and second portions being disposed opposite each other across a reading position of the sensor unit, and wherein a bottom portion of the sensor unit includes a first contact member configured to contact a surface of the first portion during movement of the carriage, and a second contact member configured to contact a surface of the second portion during movement of the carriage.

6. The reading apparatus according to claim 5, wherein each of the first and second contact members is a rotating member configured to contact a surface of the pressing unit to be rotatably driven.

7. The reading apparatus according to claim 1, wherein the pressing unit is made of a flexible member having lower stiffness than the supporting surface has.

8. The reading apparatus according to claim 1, wherein, when the reading unit moves from the second position to the first position and the pressing unit presses the supporting surface, a first portion of the pressing unit presses the supporting surface, and subsequently a second portion of the pressing unit different from the first portion in a direction of movement of the sheet presses the supporting surface.

9. The reading apparatus according to claim 1, wherein the movement mechanism includes an arm configured to rotatably move the reading unit, and a mechanism configured to apply a force to the arm in a direction for reducing a force for rotatably moving the reading unit, and the mechanism is configured to change the force as the arm rotates.

10. A printing apparatus comprising:
a printing unit configured to print information on a sheet; and
a reading apparatus,
wherein the reading apparatus comprises:
a reading unit including a sensor unit configured to read information on the sheet, a pressing unit configured to press a supporting surface for supporting the sheet, and a carriage configured to hold the sensor unit and to move on the pressing unit; and
a movement mechanism configured to move the reading unit between a first position in which the pressing unit presses the supporting surface during reading of the information and a second position in which the pressing is released during movement of the sheet on the supporting surface.

11. The printing apparatus according to claim 10, wherein a conveyance roller for conveying the sheet is disposed upstream of the printing unit, and no conveyance roller is disposed downstream of the printing unit.

12. The printing apparatus according to claim 10, wherein a sheet on which a pattern is formed by the printing unit is conveyed so that an area having the formed pattern passes a position where the sensor unit performs reading, and subsequently the sensor unit reads the pattern after the sheet has being conveyed in a reverse direction.

13. The printing apparatus according to claim 12, wherein the pattern formed in a plurality of rows is read by repeating one-row read on the pattern via the sensor unit while moving the carriage and step-feed of the sheet, and wherein the reading unit is set to the first position during the one-row read and is set to the second position during the step-feed.

14. The printing apparatus according to claim 13, wherein the second position includes a plurality of positions different in interval between the pressing unit and the supporting surface, and the interval during the step-feeding is smaller than the interval when a leading edge of the sheet on which the pattern is formed by the printing unit is introduced onto the supporting surface.

15. The printing apparatus according to claim 13, wherein an operation for returning the carriage to a home position is performed during the step-feeding.

16. The printing apparatus according to claim 13, wherein the reading is enabled in each of forward and backward paths of a reciprocal motion of the carriage, the step-feeding is performed after one row in the pattern is read in the forward path, and the following row in the pattern is read in the backward path.

17. The printing apparatus according to claim 10, wherein the reading unit further includes a drying unit configured to blow off air to the sheet, the drying unit being disposed downstream of the sensor unit.

18. The printing apparatus according to claim 10, where the reading apparatus is detachable, as a unit, from the printing apparatus.

* * * * *